(12) United States Patent
Wang

(10) Patent No.: US 9,854,154 B2
(45) Date of Patent: *Dec. 26, 2017

(54) INFRARED RECORDING DEVICE AND INFRARED RECORDING METHOD

(71) Applicant: MISSION INFRARED ELECTRO OPTICS TECHNOLOGY CO., LTD, Hangzhou, Zhejiang (CN)

(72) Inventor: Hao Wang, Hangzhou (CN)

(73) Assignee: MISSION INFRARED ELECTRO OPTICS TECHNOLOGY CO., LTD, Hangzhou (CN)

( * ) Notice: Subject to any disclaimer, the term of this patent is extended or adjusted under 35 U.S.C. 154(b) by 292 days.

This patent is subject to a terminal disclaimer.

(21) Appl. No.: 14/403,193

(22) PCT Filed: May 23, 2013

(86) PCT No.: PCT/CN2013/076130
§ 371 (c)(1),
(2) Date: Nov. 23, 2014

(87) PCT Pub. No.: WO2013/174290
PCT Pub. Date: Nov. 28, 2013

(65) Prior Publication Data
US 2015/0156407 A1    Jun. 4, 2015

(30) Foreign Application Priority Data
May 23, 2012  (CN) .......................... 2012 1 0166888
May 23, 2012  (CN) .......................... 2012 1 0167547

(51) Int. Cl.
*H04N 5/33* (2006.01)
*H04N 5/232* (2006.01)
*G06K 9/00* (2006.01)

(52) U.S. Cl.
CPC ..... *H04N 5/23216* (2013.01); *G06K 9/00798* (2013.01); *H04N 5/23293* (2013.01); *H04N 5/33* (2013.01)

(58) Field of Classification Search
CPC ........ H04N 5/76; H04N 5/23293; H04N 5/33; G06K 9/00684; G06K 9/2054
(Continued)

(56) References Cited

U.S. PATENT DOCUMENTS

| 2008/0136919 A1* | 6/2008 | Tsuji .................. H04N 5/23225 348/207.1 |
| 2010/0262912 A1* | 10/2010 | Cha ....................... G11B 27/105 715/719 |
| 2013/0176418 A1* | 7/2013 | Pandey .................. G01N 25/72 348/83 |

FOREIGN PATENT DOCUMENTS

| CN | 1520164 A | 8/2004 |
| CN | 201765696 U | 3/2011 |

OTHER PUBLICATIONS

International Search Report of PCT Patent Application No. PCT/CN2013/076130 dated Aug. 29, 2013.

* cited by examiner

*Primary Examiner* — William Tran

(57) ABSTRACT

An infrared recording device and infrared recording method in the invention relates to an infrared recording device and an application field of infrared detection. In the prior art, corresponding record between infrared files and object information is inconvenient. According to the infrared recording device and infrared recording method in the invention, based on prestored object information, special object information is designated, and the object information is record with the infrared file when recording. It is not necessary or is (Continued)

convenient to find and select the object information. Thereby, the present problems are solved.

20 Claims, 19 Drawing Sheets

(58) Field of Classification Search
USPC .......................................................... 348/164
See application file for complete search history.

| 501 | 502 | 503 | 504 |
|---|---|---|---|
| substation | equipment area | equipment type | phase |
| substation 1 | equipment area 1 | equipment I | phase A |
| substation 1 | equipment area 1 | equipment I | phase B |
| substation 1 | equipment area 1 | equipment I | phase C |
| substation 1 | equipment area 1 | equipment II | phase A |
| substation 1 | equipment area 1 | equipment II | phase B |
| substation 1 | equipment area 1 | equipment II | phase C |
| substation 1 | equipment area 2 | equipment III | phase A |
| substation 1 | equipment area 2 | equipment III | phase B |
| substation 1 | equipment area 2 | equipment III | phase C |
| substation 1 | equipment area 3 | equipment I | phase A |
| substation 1 | equipment area 3 | equipment I | phase B |
| substation 1 | equipment area 3 | equipment I | phase C |
| substation 1 | equipment area 3 | equipment II | phase A |
| substation 1 | equipment area 3 | equipment II | phase B |
| substation 1 | equipment area 3 | equipment II | phase C |

FIG. 5

| sequence setting | equipment area | sequence setting | equipment type | sequence setting | phase |
|---|---|---|---|---|---|
| 1 | equipment area 1 | 1 | equipment I | 1 | phase C |
| | | | | 2 | phase B |
| | | | | 3 | phase A |
| | | 2 | equipment II | 1 | phase A |
| | | | | 2 | phase B |
| | | | | 3 | phase C |
| 2 | equipment area 2 | 1 | equipment III | 1 | phase C |
| | | | | 2 | phase B |
| | | | | 3 | phase A |
| 3 | equipment area 3 | 1 | equipment I | 1 | phase A |
| | | | | 2 | phase B |
| | | | | 3 | phase C |
| | | 2 | equipment II | 1 | phase C |
| | | | | 2 | phase B |
| | | | | 3 | phase A |

FIG. 7

| substation | equipment area | equipment type | phase |
|---|---|---|---|
| substation | equipment area | equipment type | phase |
| substation 1 | equipment area 1 | equipment I | phase A |
| substation 1 | equipment area 1 | equipment I | phase B |
| substation 1 | equipment area 1 | equipment I | phase C |
| substation 1 | equipment area 1 | equipment II | phase A |
| substation 1 | equipment area 1 | equipment II | phase B |
| substation 1 | equipment area 1 | equipment II | phase C |
| substation 1 | equipment area 2 | equipment III | phase A |
| substation 1 | equipment area 2 | equipment III | phase B |
| substation 1 | equipment area 2 | equipment III | phase C |
| substation 1 | equipment area 3 | equipment I | phase A |
| substation 1 | equipment area 3 | equipment I | phase B |
| substation 1 | equipment area 3 | equipment I | phase C |
| substation 1 | equipment area 3 | equipment II | phase A |
| substation 1 | equipment area 3 | equipment II | phase B |
| substation 1 | equipment area 3 | equipment II | phase C |
| substation 2 | … | … | … |
| … | … | … | … |
| substation 3 | … | … | … |
| … | … | … | … |

FIG. 15

| substation | equipment area | equipment type | phase |
|---|---|---|---|
| substation | equipment area | equipment type | phase |
| substation 1 | equipment area 1 | equipment I | phase A |
| substation 1 | equipment area 1 | equipment I | phase B |
| substation 1 | equipment area 1 | equipment I | phase C |
| substation 1 | equipment area 1 | equipment II | phase A |
| substation 1 | equipment area 1 | equipment II | phase B |
| substation 1 | equipment area 1 | equipment II | phase C |

| sequence | substation | equipment area | equipment type | phase |
|---|---|---|---|---|
| 1 | substation 1 | equipment area 1 | equipment I | phase C |
| 2 | substation 1 | equipment area 1 | equipment I | phase B |
| 3 | substation 1 | equipment area 1 | equipment I | phase A |
| 4 | substation 1 | equipment area 1 | equipment II | phase A |
| 5 | substation 1 | equipment area 1 | equipment II | phase B |
| 6 | substation 1 | equipment area 1 | equipment II | phase C |

2102

| sequence | substation | equipment area | equipment type | phase |
|---|---|---|---|---|
| 1 | substation 1 | equipment area 2 | equipment III | phase C |
| 2 | substation 1 | equipment area 2 | equipment III | phase B |
| 3 | substation 1 | equipment area 2 | equipment III | phase A |

2103

| sequence | substation | equipment area | equipment type | phase |
|---|---|---|---|---|
| 1 | substation 1 | equipment area 3 | equipment I | phase A |
| 2 | substation 1 | equipment area 3 | equipment I | phase B |
| 3 | substation 1 | equipment area 3 | equipment I | phase C |
| 4 | substation 1 | equipment area 3 | equipment II | phase C |
| 5 | substation 1 | equipment area 3 | equipment II | phase B |
| 6 | substation 1 | equipment area 3 | equipment II | phase A |

2104

| sequence | substation | equipment area | equipment type | phase |
|---|---|---|---|---|
| 1 | substation 1 | equipment area 1 | equipment I | phase C |
| 2 | substation 1 | equipment area 1 | equipment I | phase B |
| 3 | substation 1 | equipment area 1 | equipment I | phase A |
| 4 | substation 1 | equipment area 3 | equipment I | phase A |
| 5 | substation 1 | equipment area 3 | equipment I | phase B |
| 6 | substation 1 | equipment area 3 | equipment I | phase C |

INFRARED RECORDING DEVICE AND INFRARED RECORDING METHOD

BACKGROUND OF THE INVENTION

Field of the Invention

This invention relates to an infrared recording device, an infrared processing device, and an application field of infrared detection and, more particularly, to an infrared recording device and an infrared recording method.

Description of the Related Art

An infrared thermal image is different from a visible image. In the photographed visible image, the object to be photographed may be determined according to the information in the image, such as a color, a nameplate, or a shape. However, a photographed specified object cannot be easily determined according to information in an infrared thermal image. For example, the photographed specified object cannot be effectively recognized via a color or a nameplate. Thus, a user may omit objects during photographing.

Further, there are many similar objects to be photographed during infrared detection, and the similar objects may be the same or different types. For example, in a substation, there are different multiple groups of the objects of a switch type in an equipment area, and the multiple groups of the objects are usually next to each other. In the objects of the same group, there are still three different objects with the same shape and with different phase numbers A, B, C. Since the different objects of the same type are almost the same in the infrared thermal image, a user may miss objects and may be confused during photographing, thereby reducing the efficiency. When photographing at different angles is performed or multiple units (the unit may be a specified element or a specified part) of the same objects are photographed, this problem is intensified.

At present, a file name of a thermal image file acquired by a thermal image photographing device via photographing is generated according to time or a serial number. To save and analyze subsequently, and to differentiate a thermal image file to which an object corresponds, during infrared detection, users are necessary to record object information according to cognitive of the object or a scene nameplate. The present common record mode may be a manual mode for recording a file name of a thermal image file and the corresponding object information, or a mode for attaching phonic annotation of object information on the scene to a thermal image file. These modes cause inconvenient operation, errors, to affect a photographing speed, and a heavy subsequent straighten workload.

During the subsequent processing such as batch processing for a large amount of thermal image files, it is necessary to acquire the object information to which the thermal image of the object in each thermal image file corresponds. Thus, a computer can finish the automatic batch processing for the thermal images of the objects. However, in the present manual record way, the thermal image file needs to be manually named to relate the object information according to the manually record object information, causing the heavy subsequent workload and mistakes.

Further, because of the reasons mentioned above, a user is difficult to correspond the object information by recognizing the infrared thermal image, thereby intensifying the inconvenience of the manual record of the object information during photographing and the subsequent manual naming.

Since the thermal image detection technology is applied, there is no proper way to conveniently and quickly allow the record thermal image file to be associated with the object information. The technical persons in the field always try to solve this the problem. For example, a thermal image photographing device with a GPS device may provide GPS instructing information during photographing of a power route and may make a related record of the GPS information and a thermal imaging file. However, a user may not easily understand the specified object to be photographed according to the GPS information, and the record GPS information cannot correspond to the specified object when there are multiple objects at the same position to be photographed respectively. The above prior art fails to solve the omission problem during photographing. Thus, how to conveniently make a related record of the thermal imaging file and the corresponding object information is a problem.

Therefore, an infrared recording device is needed, to solve the present problem.

BRIEF SUMMARY OF THE INVENTION

This invention provides an infrared recording device and an infrared recording method. According to multiple object information, such as representing objects to be photographed, the object information therein is designated as special object information during photographing. Thereby, a user can photograph the object and record infrared data associated with information related to the designated special object information, and object instructing information can be displayed or switched according to a sequence (as a photographing sequence) of the object information, without or facilitating finding or selection of the object information. Obviously, the photographing speed is improved, omissions are avoided, and operation is simple.

This invention provides an infrared recording device including the following parts.

An acquiring part is used for acquiring thermal imaging data. An information designating part is used for designating object information as special object information based on multiple object information stored in an information storing part. In response to record instructing operation or according to a specified record condition, a record part is used for recording specified infrared data associated with information related to the designated special object information. The infrared data is the thermal imaging data acquired by the acquiring part and/or data acquired after specified processing for the thermal imaging data acquired by the acquiring part.

In response to switch instructing operation or according to a specified switch condition, the information designating part switches the designated special object information according to a sequence of the object information, based on the object information stored in the information storing part.

This invention further provides an infrared photographing device including an acquired part, a display controlling part, an information designating part, and a record part. The acquiring part is used for acquiring thermal imaging data. The display controlling part is used for displaying a specified amount of object instructing information according to a sequence of object information, based on multiple object information stored in an information storing part. The information designating part is used for designating the object information as special object information based on selection of a user. In response to record instructing operation or according to a specified record condition, the record part is used for recording specified infrared data associated with information related to the designated special object information, and the infrared data is the thermal imaging data acquired by the acquiring part or data acquired after specified processing for the thermal imaging data acquired by the acquiring part.

This invention provides an infrared recording method including the following steps.

An acquiring step is used for acquiring thermal imaging data.

An information designating step is used for designating object information as special object information based on multiple object information stored in an information storing part.

In response to record instructing operation or according to a specified record condition, a recording step is used for recording specified infrared data associated with information related to the designated special object information. The infrared data is the thermal imaging data acquired in the acquiring step or data acquired after specified processing for the thermal imaging data acquired in the acquiring step.

In response to switch instructing operation or according to a specified switch condition, the information designating step is used for switching the designated special object information according to a sequence of the object information, based on the object information stored in the information storing part.

In addition, this invention provides a computer program executed by an infrared recording device. The computer program allows the infrared recording device to perform the following steps.

An acquiring step is used for acquiring thermal imaging data.

An information designating step is used for designating object information as special object information based on multiple object information stored in an information storing part.

In response to record instructing operation or according to a specified record condition, a recording step is used for recording specified infrared data associated with information related to the designated special object information. The infrared data is the thermal imaging data acquired in the acquiring step or data acquired after specified processing for the thermal imaging data acquired in the acquiring step.

In response to switch instructing operation or according to a specified switch condition, the information designating step is used for switching the designated special object information according to a sequence of the object information, based on the object information stored in the information storing part.

This invention further provides a readable storage medium storing a computer program. The computer program allows an infrared recording device to perform the following steps.

An acquiring step is used for acquiring thermal imaging data.

A display controlling step is used for displaying a specified amount of object instructing information according to a sequence of object information, based on multiple object information stored in an information storing part.

An information designating step is used for designating the object information as special object information based on selection of a user.

In response to record instructing operation or according to a specified record condition, a recording step is used for recording specified infrared data associated with information related to the designated special object information. The infrared data is the thermal imaging data acquired in the acquiring step and/or data acquired after specified processing for the thermal imaging data acquired in the acquiring step.

Other aspects and advantages of this invention are described hereinbelow.

BRIEF DESCRIPTION OF THE DRAWINGS

FIG. 5 is a schematic diagram showing an exemplary list of object information stored in an information storing part;

FIG. 7 is a schematic diagram showing one sequencing factor to which the object information acquired after the sequence setting process corresponds;

FIG. 15 is a schematic diagram showing an exemplary list of the object information stored in an information storing part according to another embodiment;

FIG. 16 is a schematic diagram showing an exemplary list of the object information after filtering according to the filter condition according to another embodiment;

FIG. 21 is a schematic diagram showing an exemplary list of the object information included in data files 1, 2, and 3 and an exemplary list of the object information and the sequence determined after group sequencing and filtering according to one embodiment;

DETAILED DESCRIPTION OF THE INVENTION

Embodiments of the invention are described hereinbelow. In a first embodiment of the invention, an infrared recording device (called a thermal imaging device for short hereinbelow) with a thermal image photographing function is taken for example. It is also applicable to a processing device continuously receiving thermal imaging data, such as a personal computer, a personal digital processing device, or other processing devices.

Further, the called thermal imaging data may be thermal image AD data. In addition, the thermal imaging data is not limited to the thermal image AD data, and may be image data of an infrared thermal image, array data of temperature values, or compressed data thereof or of the above various mixed data.

The embodiments of the invention are described according to drawings in detail. The embodiments described hereinbelow are used for understanding the invention better and do not limit the scope of the invention, and different modes may be changed in the scope of the invention.

Figure 1:
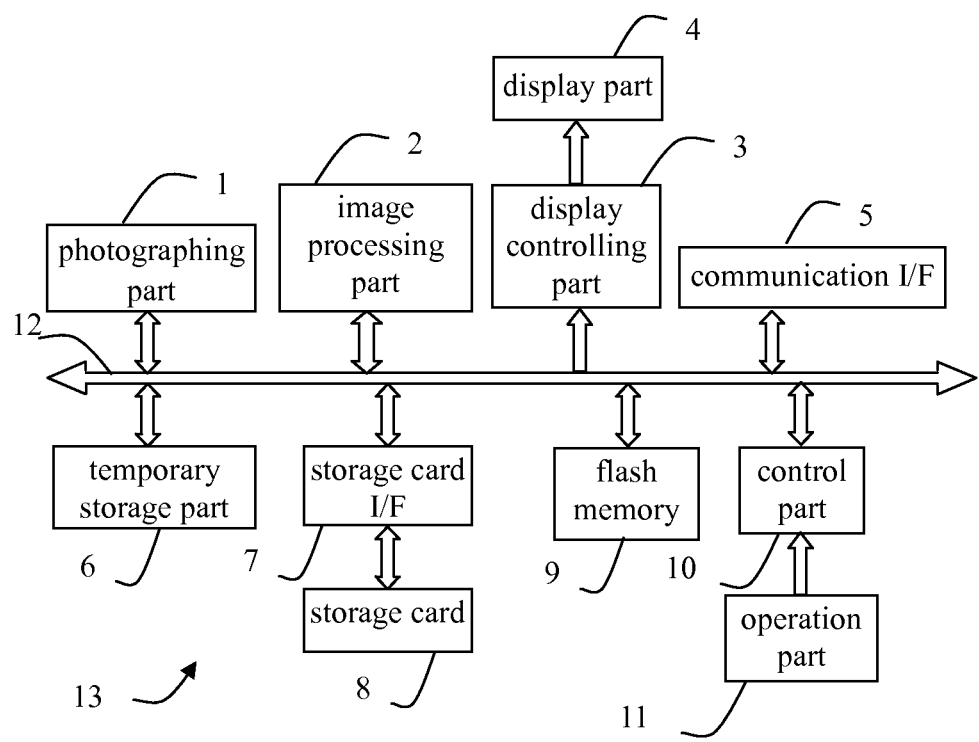
FIG. 1 is a block diagram showing an infrared photographing device according to one embodiment of the invention.
Figure 2:
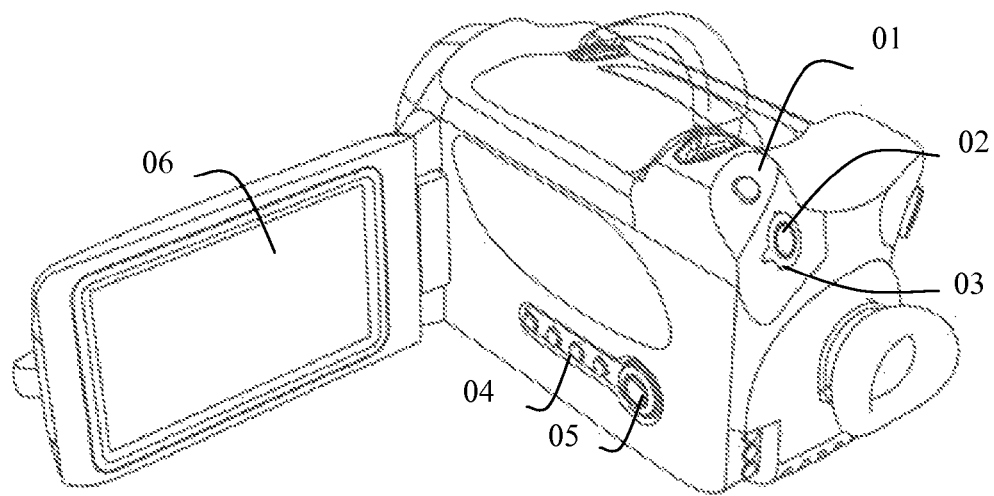
FIG. 2 is an outline diagram showing the infrared photographing device according to one embodiment of the invention.

FIG. 1 is a block diagram showing a thermal imaging device according to the first embodiment. FIG. 2 is an outline diagram showing the thermal imaging device according to the first embodiment.

A thermal imaging device 13 includes a photographing part 1, an image processing part 2, a display controlling part 3, a display part 4, a communication I/F 5, a temporary storage part 6, a storage card I/F 7, a storage card 8, a flash memory 9, an operation part 11, and a control part 10. The control part 10 is connected with the corresponding parts via a control and data bus 12, and is responsible for overall control of the thermal imaging device 13.

The photographing part 1 includes an optical part, a lens driving part, an infrared detector, and a signal preprocessing circuit, which are not shown. The optical part is composed of infrared optical lens, and is used for focusing received infrared radiation on the infrared detector. The lens driving part drives the lenses to perform focusing or zooming operation according to a control signal of the control part 10, and the optical part may also be manually regulated. The infrared detector, such as a refrigerating or non-refrigerated infrared focal plane detector, converts the infrared radiation passing through the optical part to electrical signals. The signal preprocessing circuit, including a sampling circuit and an AD conversion circuit, performs signal processing such as sampling and automatic gain control for the signals read from the infrared detector in a specified cycle and converts the signals to digital thermal imaging data (the thermal image AD data) via the AD conversion circuit. In the embodiment, the photographing part 1 is as an example of a photographing part and is used for photographing to acquire the thermal imaging data.

The image processing part 2 is used for performing specified processing for the thermal imaging data acquired by the photographing part 1. The processing of the image processing part 2 may be modification, interpolation, pseudo-color, compression, or decompression, which is the processing for converting to the data suitable for displaying and recording. The image processing part 2 may be realized by a DSP, other microprocessors, or a programmable FPGA, or may be integrally formed with the control part 10 or the same microprocessor. The processing of the thermal imaging data generating the infrared thermal image may be pseudo-color processing. In detail, in one embodiment, a corresponding range of a pseudo-color plate is determined according to a range of AD values of the thermal imaging data or a setting range of the AD values, and the particular color value to which each AD value of the thermal imaging data corresponds in the range of the pseudo-color plate is used as the image data of the corresponding pixel position in the infrared thermal image. In addition, gray scaling for the infrared image may be as a special example of the pseudo-color processing. In addition, based on the record instructing operation by the control part 10, the image processing part 2 is used for compressing the thermal imaging data to acquire compressed thermal imaging data according to specified compression processing, and then the thermal imaging data is record to a record medium such as the storage card 8.

The display controlling part 3 allows the image data stored in the temporary part 6 to be displayed on the display part 4, based on the control of the control part 10. For example, in the embodiment, in a normal mode, the infrared thermal images generated by the thermal imaging data acquired by photographing are displayed continuously. In an information mode, object instructing information displayed specially and the infrared thermal image (including a dynamic infrared thermal image and a static infrared thermal image) are displayed at the same time. In a playback mode, the infrared thermal image read and expanded from the storage card 8 is displayed. In addition, different kinds of setting information may also be displayed. In detail, in one embodiment, the display controlling part 3 may include a VRAM, a VRAM control unit, and a signal generating unit. Based on the control of the control part 10, the signal generating unit reads image data, read from the temporary storage part 6 and stored in the VRAM, regularly from the VRAM via the VRAM control unit, and generates display signals such as video signals output to be displayed on the display part 4. In the embodiment, the display part 4 is as an example of the display part 4. However, the invention is not limited thereto. The display part 4 may further be other display devices connected with the thermal imaging device 13, and the thermal imaging device 13 may not include the display device in itself. Obviously, when the thermal imaging device 13 do not include the display device in itself, the control part 10 can also control the image data to be displayed and output. For example, the image data to be displayed (the control part 10 and the display controlling part 3 are as an example of the display controlling part) may be output via an image output interface (such as different kinds of wired or wireless image output interfaces i.e. an AV port or RJ45 port). The display controlling part controls to allow the display part to display and to display the output. The display controlling part 3 may be integrally formed with the image processing part 2 or the control part 10.

The communication I/F 5 may be an interface for connecting the thermal imaging device 13 and an external device such as an external computer, an external storage device, or an external thermal imaging device, according to communication specifications such as USB, 1394, or network.

The temporary storage part 6, such as a volatile storage i.e. RAM or DRAM, is a buffer storage for temporarily storing the thermal imaging data output from the photographing part 1, and is a working storage of the image processing unit 2 and the control part 10 for temporarily storing the data processed by the image processing part 2 and the control part 10. However, the invention is not limited thereto. A storage or register included by a processor such as the control part 10 or the image processing part 2 may also be defined as a temporary storage part.

The storage card I/F 7 is used as an interface of the storage card 8. The storage card I/F 7 is connected with the storage card 8 as a rewritable nonvolatile storage, which can be detachably installed in a groove of the main body of the thermal imaging device 13 and can record data such as the thermal imaging data according to the control of the control part 10.

The flash memory 9 is used for storing control programs and different kinds of data used in different control.

An information storing part, for storing multiple object information, may be a storage medium in the thermal imaging device 13, such as a nonvolatile storage medium i.e. the flash memory 9 and the storage card 8 or a volatile storage medium i.e. the temporary storage part 6, and further may be other storage mediums connected with the thermal imaging device 13 wiredly or wirelessly, such as other devices connected with the communication I/F 5 wiredly or wirelessly i.e. other storage devices or storage mediums in other photographing devices or computers. Preferably, the object information may be prestored in the thermal imaging device 13 or the nonvolatile storage medium connected with the thermal imaging device 13.

The object information is the information related to objects, such as the information representing a position, a type, and a number of an object. In addition, different kinds of information, such as an attribution unit, a classified grade (such as a voltage grade or an importance grade), a model, a manufacturer, performance and characteristics, a passed photographing or repairing record, a manufacturing date, or a service life, related to an object, may be taken for example. The information, such as for generating the object instructing formation, included in the object information, may facilitate a user to determine the object to be photographed, and may facilitate subsequent processing such as batch processing after recording with the infrared data.

In one preferred embodiment, the object information may be composed of different classified information. In FIG. 5, an exemplary list 5001 shows object information stored in the information storing part in one embodiment. Each of the object information is composed of attribute information of some specified attributes. For example, the object information 500 "substation 1 equipment area 1 equipment I phase A" may include the attribute information "substation 1" to which a substation attribute 501 corresponds, the attribute information "equipment area 1" to which an equipment area attribute 502 corresponds, the attribute information "equipment I" to which an equipment type attribute 503 corresponds, and the attribute information "phase A" to which a phase attribute 504 corresponds. However, the invention is not limited thereto. The object information may be stored in other modes except the classified mode.

The operation part 11 is used for a user to perform switch instructing operation, to perform record instructing operation, or to input setting information, and the control part 10 performs the corresponding programs according to the operation signals from the operation part 11. For example, the operation part 11 may include a record key 01 (configured for the record instructing operation), a switch key 02 (configured for the switch instructing operation of the object information), a focusing key 03, an enter key 04, and a cross key 05, as shown in FIG. 2. In addition, the record key 01 and the switch key 02 may also be configured for specified instructing operation. In response to signals of the operation, the control part 10 may continuously record and switch. However, the invention is not limited thereto. A touch screen 06 or a phonic part may be used for realizing the operation.

An infrared recording method (an information mode) is described hereinbelow. In the embodiment, the control part 10 is as an example of a sequence determining part, an information designating part, a display controlling part, and a process counting part. In the embodiment, a scene of infrared detection for power equipment in an equipment area 1 (1101), an equipment area 2 (1102), and an equipment area 3 (1103) in a substation 1 by users in FIG. 11, is taken for example. Before photographing formally, a data file including the object information as shown in the exemplary list in FIG. 5 are prestored in the flash memory 9. The embodiment is described according to FIG. 3 to FIG. 11.

Figure 4:
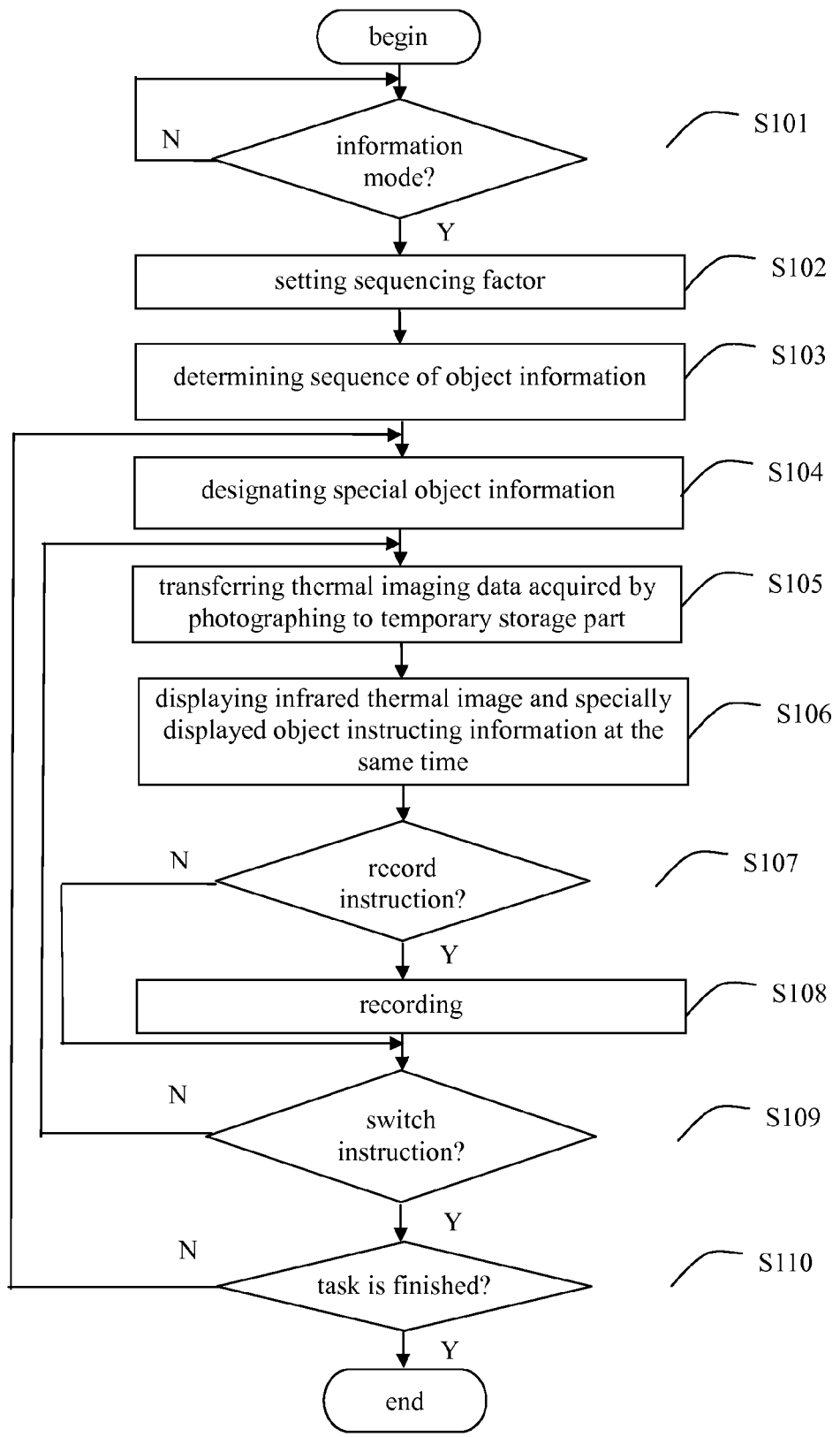
FIG. 4 is a flow chart showing an information mode according to one embodiment of the invention.

The control part 10 controls the whole action of the thermal imaging device 13, and the control part 10 may be realized by a CPU, a MPU, a SOC, or a programmable FPGA. The flash memory 9 stores the control programs and different data used in different control. The control part 10 performs control of multiple modes via the control programs. After the power is on, the interior circuit of the control part 10 is initialized. Then, a standby photographing mode is entered. That is, the photographing part 1 acquires thermal imaging data via photographing, the image processing part 2 performs specified processing for the thermal imaging data acquired by the photographing part 1, to be stored in the temporary storage part 6, and the control part 10 controls the display controlling part 3 to continuously display infrared thermal images in a dynamic image mode on the display part 4. In this state, the control part 10 performs the control to continuously monitor if other modes are switched according to the predetermined condition or the shutdown operation is performed. If yes, the corresponding processing is performed. In FIG. 4, the control steps of the information mode are described as follows.

In step S101, the control part 10 performs the control to continuously monitor if a user selects the information mode via the operation part 11. When the selection of the information mode is detected, step S102 is performed.

In the step S102, a sequencing factor of the object information is set.

Figure 3:
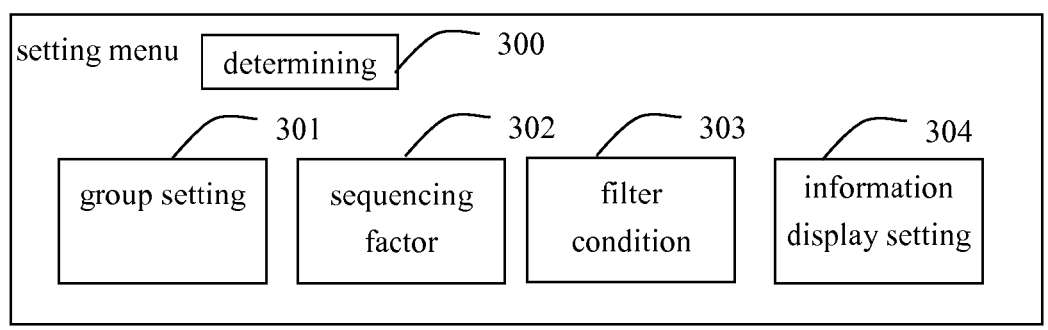
FIG. 3 is a schematic diagram showing a display interface of a task and sequence setting menu.

The control part 10 controls to allow the display part 4 to display a setting interface including a plurality of setting options as shown in FIG. 3, such as a group setting option 301 configured for setting a group sequence, a sequencing factor option 302 for setting a sequencing factor of the object information, a filter condition option 303 for setting a filter condition, an information display setting option 304, and a determining option 300 for determining the settings, and then continuously detects whether a user selects one of the setting options for setting or selects the determining option 300. If one of the setting options is selected, a corresponding setting interface is entered. After the corresponding setting is finished and determined, return to the setting interface as shown in FIG. 3, and the control part 10 continuously detects whether the user selects one of the setting options for setting or selects the determining option 300. Then, when the selection of the determining option 300 is detected, step S103 is performed. If the determination of the determining option 300 is detected, while other settings are not performed, the step S103 is performed according to the previous default settings.

Figure 6:
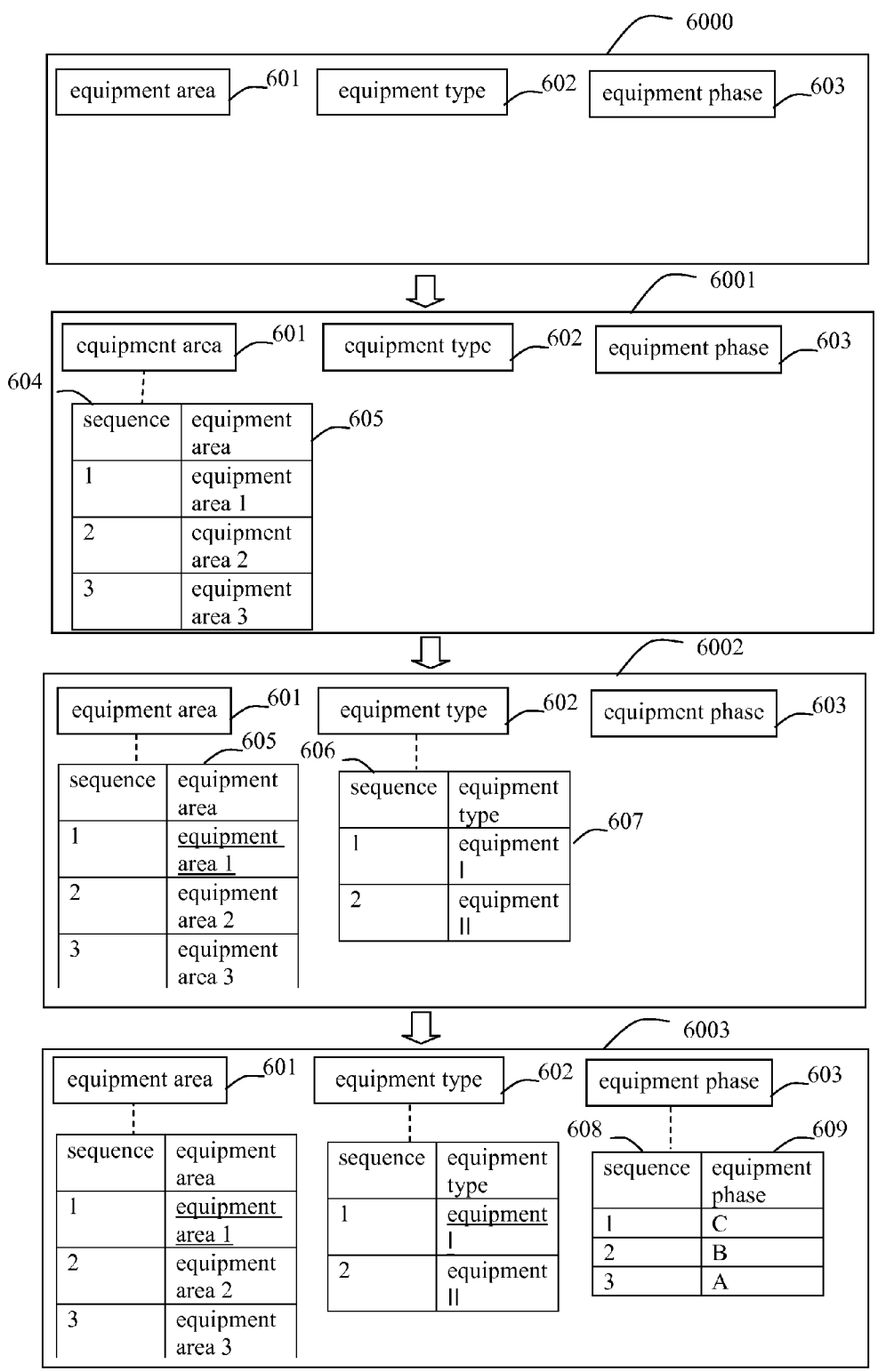
FIG. 6 is a schematic diagram showing a setting interface in a sequence setting process according to one embodiment of the invention.

In the embodiment, the user selects the sequencing factor option 302, and then, in response to the operation, the control part 10 allows the display part 4 to display a sequence setting interface 6000 as shown in FIG. 6. The user sets a sequencing factor of the object information according to a substation distribution as shown in FIG. 11. In the embodiment, the display part 4, the operation part 11, and the control part 10 are as an example of a sequence setting part.

Further, the control part 10 transfers the object information stored in the flash memory 9 to the temporary storage part 6, and the transferred information may be all attribute information or specified part attribute information of the object information. In addition, the object information can be transferred to the temporary storage part 6 when the power is on.

A sequence setting part is used for users to set a sequencing factor of the object information. The sequence setting part includes a keyword determining unit for determining a keyword related to a sequence of the objects and a sequencing factor determining unit for determining the sequencing factor of the keyword. The sequence setting part is used for acquiring the sequencing factor of the object information according to a sequencing factor of a first keyword or the sequencing factor of the first keyword combined with a sequencing factor of an auxiliary keyword. The sequencing factor may be a sequence or a sequencing rule, and the sequencing rule may be a number sequencing rule, a letter sequencing rule, a Chinese phonetic letter sequencing rule, a Chinese stroke sequencing rule, or a sequencing rule acquired after manual sequencing for the keyword by the users.

When the object information to be sequenced is the object information with different first keywords, the sequence setting part is used for setting the sequencing factor of the first keyword as the sequencing factor of the object information. When the object information to be sequenced includes multiple object information with the same first keyword, the sequencing factor of the object information is determined according to a combination of the sequencing factor of the first keyword and the sequencing factor of the auxiliary keyword. A keyword of the first sequencing factor is called the first keyword, the sequencing factor of the auxiliary keyword at least includes a sequencing factor of a second keyword, and the keyword of the second sequencing factor in the object information is called the second keyword. When there is the multiple object information with the same first keyword and the same second keyword, the sequencing factor of the auxiliary keyword at least includes sequencing factors of the second keyword and a third keyword, the keyword of the third sequencing factor in the object information is called the third keyword, and so on.

The keyword determining unit is used for determining a keyword related to a sequence. For example, the keyword related to the sequence may be determined according to one or more embodiments as follows. When there are the first keyword and auxiliary keyword, the same or different embodiments may be performed.

In one embodiment, based on the object information stored in the information storing part, a keyword of the attribute information of the specified attribute in the object information is enquired and acquired, and the enquired keyword is determined as the keyword related to the sequence.

In addition, based on the object information stored in the information storing part and a keyword enquiring condition, the keyword of the attribute information of the specified attribute in the object information satisfying the keyword enquiring condition is enquired, and the enquired keyword is determined as the keyword related to the sequence.

In addition, the keyword may be prestored for the users to select, and then the keyword selected by the user may be determined as the keyword related to the sequence.

In addition, by determining a keyword attribute, the keyword satisfying the keyword attribute may be determined as the keyword related to the sequence. For example, when the object information is associated with time information (for example, a data file may be a log file including the object information and time), the keyword attribute (such as a time attribute and so on) may be provided for selection, and the keyword (the time) satisfying the attribute may be determined as the keyword related to the sequence, based on the keyword attribute (such as the time attribute) selected by a user.

In addition, a default keyword may be determined as the keyword related to the sequence.

In addition, a keyword input by a user may be determined as the keyword related to the sequence.

The sequencing factor determining unit is used for determining a sequencing factor of a keyword. For example, the sequencing factor may be determined according to one or more embodiments as follows. When there are the first keyword and the auxiliary keyword, the same or different embodiments may be performed.

In one embodiment, the sequencing factor is prestored for users to select, and a sequencing factor selected by a user is determined as the sequencing factor corresponding to the keyword. In addition, the sequencing factor may be default. In addition, the sequencing factor of the keyword may be acquired via the sequencing operation (including the sequencing factor input by the user) of the user.

In detail, in this embodiment, based on the object information stored in the information storing part, the first keyword of the attribute information of the specified attribute in the object information is enquired and acquired, and the sequencing factor of the first keyword is determined according to the operation of the user. The control part 10 allows the display part 4 to display the sequence setting interface 6000 as shown in FIG. 6. An equipment area setting option 601, an equipment type setting option 602, and a phase setting option 603 are configured as menu options representing keyword enquires and sequencing factor settings. As shown in a sequence setting interface 6001, when the equipment area setting option 601 is selected (may be default), the control part 10 enquires the keyword of the attribute information of the equipment area attribute of the object information, to acquire an equipment area keyword (the first keyword) list 605. Then, based on the sequence between the first keywords (an equipment area 1, an equipment area 2, and an equipment area 3) set by the user, the sequencing factor of the first keywords is determined. The sequence in a sequence list 604 may be numbers keyed in, or may be set by selecting the keywords in the equipment area keyword list 605 and dragging via a cross key or a touch screen.

In the embodiment, the keyword of the attribute information of the equipment area is used as the first keyword. As the object information to be sequenced includes multiple object information with the same first keyword, the sequencing factor of the object information may be determined according to the combination of the sequencing factor of the first keyword and the sequencing factor of the auxiliary keyword.

The keyword determining unit enquires the auxiliary keyword of the attribute information of the specified attribute in the object information satisfying a keyword enquiring condition, based on the object information stored in the information storing part and the determined keyword enquiring condition. The keyword enquiring condition may be one of the first keywords determined before. When there are auxiliary keywords including the second keyword or more, the keyword enquiring condition may be one of the first keywords determined before and one keyword of the auxiliary keywords on each grade. However, the invention is not limited thereto. The keyword enquiring condition may be keyed in.

Further, when a user selects the equipment area 1, the control part 10 determines the equipment area 1 (one of the first keywords, the keyword with an underline in an equipment area keyword list 605 in a sequence setting interface 6002) as the keyword enquiring condition. The control part 10 acquires a keyword (the second keyword) of the attribute information of the equipment type by enquiring the attribute information of the equipment type of the object information satisfying the keyword enquiring condition "equipment area 1", further to display an equipment type keyword list 607. The user sets a sequence of the equipment types to acquire a sequence in a sequence list 606. Then, taking "equipment I" selected by the user as one of the keyword enquiring conditions (the keyword marked by an underline in an equipment type keyword list 607 in a sequence setting interface 6003), the control part 10 acquires an equipment phase keyword list 609 by enquiring the attribute information of the equipment phase of the object information satisfying the keyword enquiring conditions "equipment area 1" and "equipment I", and acquires the sequence in a sequence list 608 by setting the sequence of the phases. Then, the sequences of the equipment type and equipment phase in the equipment area 1, the equipment area 2, and the equipment area 3 are set in a similar way. When the setting of the sequencing factor is finished, the enter key 04 of the operation part 11 is pressed to determine the sequence, then to return to the setting interface as shown in FIG. 3, and then the enter key 04 of the operation part 11 is pressed again, to determine the determining option 300. The sequencing factor to which the object information corresponds is acquired as shown in an exemplary list in FIG. 7, and the sequencing factor of the object information is record in the temporary storage part 6 or record in the flash memory 9, such as a configuration file for subsequent use. In addition, a data file of the object information attached with the sequence may be generated, and step S103 is performed.

In the embodiment, based on the object information stored in the information storing part, the first keyword of the sequence is enquired. However, if a filter condition for determining the object information is set (or default) before, the filter condition may be configured as one keyword enquiring condition of the keyword (including the first keyword and the auxiliary keyword).

The advantages of enquiring the keyword of the attribute information of the specified attribute to set the sequencing factor is to avoid inconvenience of sequence adjustment caused by displaying a large amount of object information and the corresponding set sequence on the display part. Further, the sequence keyword acquired by enquires may be simplified, and inconvenience of sequence setting caused by the display of redundant information may be avoided via the keyword enquiring conditions.

In the step S103, the sequence of the object information is determined.

A sequence determining part is used for determining a sequence of the object information stored in the information storing part. When the sequencing factor is a sequencing rule, the sequence determining part is used for the object information stored in the information storing part, such as extracting a keyword and sequencing the object information according to the sequencing rule of the keyword, thus to determine the sequence of the object information. When there are a plurality of keywords, the sequencing is performed according to the first keyword and rule, and then the object information with the same first keyword is sequenced according to the second keyword, and so on.

In the embodiment, since the sequencing factor set in the step S102 is based on the sequence of each attribute information of the object information stored in the information storing part, the object information may be sequenced according to the sequence of each attribute information, thus to determine the sequence of each object information. If a data file of the object information attached with the sequence is directly generated in the step S102, there is no need to sequence the object information.

In addition, the step (S102) for setting the sequencing factor may not be necessary, and the sequence may be determined according to a prestored sequencing factor, such as a default sequencing factor. In addition, in one embodiment, the information storing part (such as the flash memory 9) prestores the object information attached with sequence information, and the sequence determining part determines a sequence of the object information followed by subsequent switch according to the sequence information attached in the object information. The attached sequence information may be identified sequencing information, such as numbers, letters, codes, or other identified sequencing information. The sequence information may be attached as the attribute information of the object information or may be attached as index information to which the object information corresponds. The object information may be stored according to specified addresses in the data file or the storage medium, which is considered as one way of attachment of the sequence information.

The object information may be sequenced according to a default sequencing rule (such as the time attribute of the object information) thus to determine the sequence of the object information. In addition, the object instructing information generated by a specified amount of the object information may be displayed on the display part, and the sequence may be determined by dragging to sequence the object instructing information via a cross key or a touch screen.

In step S104, the object information as special object information is designated. An information designating part (the control part 10) is used for designating the object information as the special object information according to the object information stored in the information storing part, and the special object information is used for acquiring the object instructing information displayed specially. In one preferable embodiment, based on the sequence, the object information "substation 1 equipment area 1 equipment I phase C" in the first place of the sequence is designated as the special object information.

The invention is not limited thereto. In other embodiments, the control part 10 monitors if there is an operation instruction for selecting the special object information.

When the operation instruction is determined, the object information to which the selected object instructing information corresponds is designated as the special object information. A display controlling part is used for controlling to allow the display part to display a specified amount of the object instructing information based on the object information stored in the information storing part. The information designating part is used for designating the object information as the special object information based on selection of a user. For example, in the object instructing information as shown in a display interface 801 of the object information in FIG. 8, the user may select one of the object instructing information via the operation part 11, and the control part 10 designates the object information, to which the object instructing information corresponds, as the special object information. In addition, the user may enter into a new display interface of the object instructing information to select the object instructing information by turning pages or moving rollers.

In step S105, the thermal imaging data acquired by the photographing part 1 is transferred to the temporary storage part 6. The image processing part 5 performs specified processing such as pseudo-color processing for the thermal imaging data photographed by the photographing part 1 to acquire image data of an infrared thermal image, and the image data is stored in the temporary storage part 6.

In step S106, the control part 10 is used for controlling to allow the display part 4 to display the infrared thermal image generated by the thermal imaging data and simultaneously to specially display the object instructing information acquired according to the special object information designated by the information designating part. The object instructing information is displayed with the infrared thermal image together on the display interface, and may be superimposed on the infrared thermal image and/or not be superimposed on the infrared thermal image.

Figure 9:
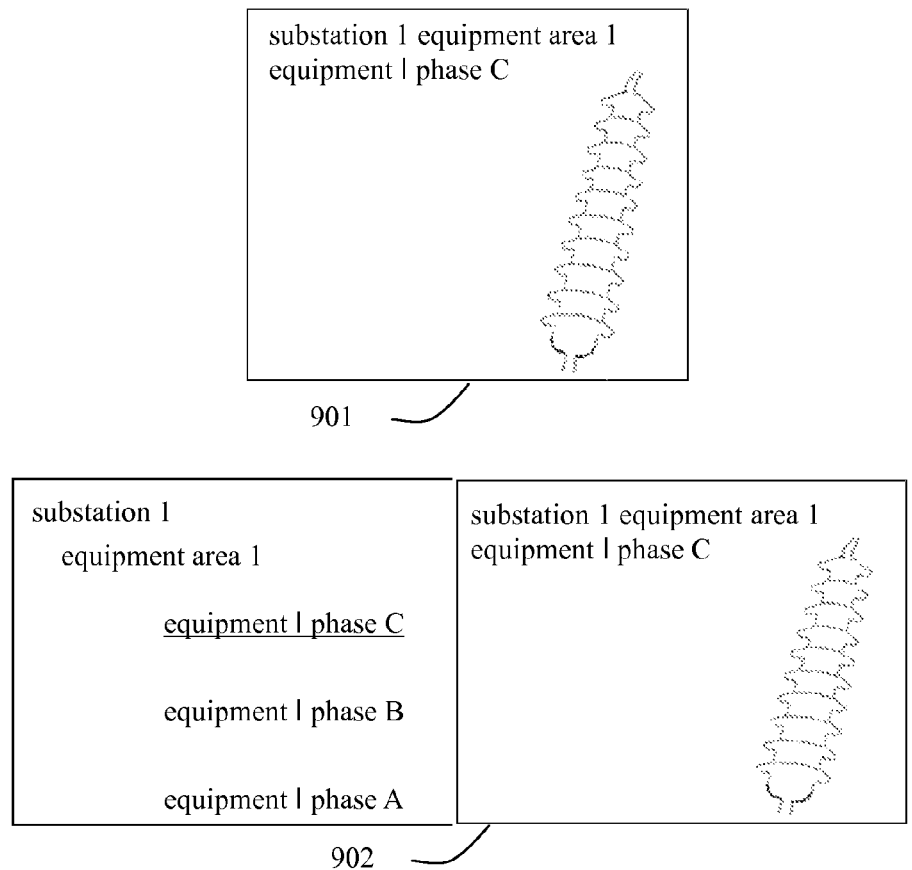
FIG. 9 is a schematic diagram showing a display interface of the specially displayed object instructing information according to two embodiments.

The special display may be that only the object instructing information acquired according to the designated special object information is displayed, as shown in 901 in FIG. 9. The special display may be that the object instructing information acquired according to a specified amount of the object information, which is not limited to the special object information, is displayed. The object instructing information acquired according to the designated special object information is displayed specially in a display mode different from that of other object instructing information. In one preferable embodiment, the display controlling part may control to allow the display part to display the infrared thermal image generated by the thermal imaging data and simultaneously to display the object instructing information acquired by the specified amount of the object information according to the sequence, based on the object information stored (determined when a task is determined) in the information storing part and the sequence of the object information determined by the sequence determining part. The object instructing information acquired according to the designated special object information is displayed specially in a display mode different from that of other object instructing information.

Figure 8:
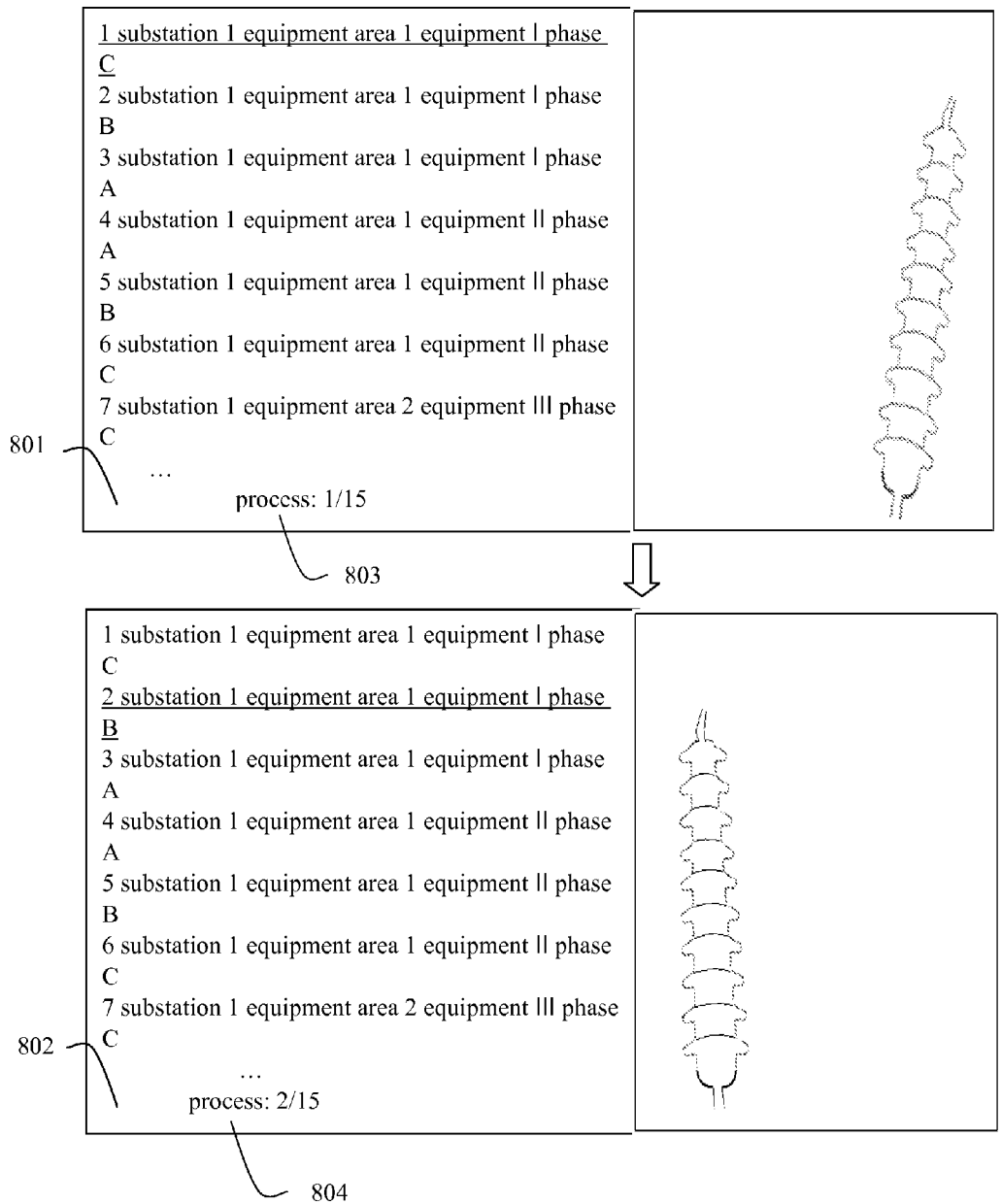
FIG. 8 is a schematic diagram showing a display interface of specially displayed object instructing information before and after switch according to one embodiment.

As shown in a display interface 801 in FIG. 8, the control part 10 controls to display the object instructing information acquired by the specified amount of the object information in a sequence. An underline is used to mark "substation 1 equipment area 1 equipment I phase C", to differentiate from other object instructing information. In addition, the difference of displaying positions, colors, backgrounds, sizes, typefaces, or word instructions, which is convenient for users to distinguish, may be regarded as the special display mode different from that of other object instructing information.

In one preferable embodiment, the display controlling part hierarchically displays specified information for generating the object instructing information in the object information. That is, to display according to the specified hierarchy and the attribute information to which each hierarchy corresponds. The hierarchical display may be displayed according to a tree-like mode, as shown in an object information bar 902 in FIG. 9, the control part 10 divides the object instructing information into specified three hierarchies according to the attribute information of the specified attribute of the substation, the equipment area, the equipment type, and the phase, further to display according to the specified positions, and further the specially displayed object instructing information is superimposed on the infrared thermal image, facilitating observation of the users.

In detail, in one embodiment of the display control, the image processing part 2 is controlled to synthesize the image data of the infrared thermal image generated by the thermal imaging data acquired by photographing and the image data of the object instructing information acquired by the designated special object information, and the synthesized image data is stored in the temporary storage part 6. Then, the display controlling part 3 is controlled to display the synthesized image data on the display part 4. As shown in 901 in FIG. 9, the synthesis is to allow the object instructing information to be superimposed on the infrared thermal image. In addition, when there is other specified object instructing information, the image processing part 2 is controlled to synthesize the image data of the infrared thermal image generated by the thermal imaging data acquired by photographing, the image data (the image data including the mark, when there is a specially displayed mark, such as an underline of the object instructing information in FIG. 8) of the specially displayed object instructing information acquired by the designated special object information, and the image data of other specified instructing information. The display controlling part 3 is controlled to display the synthesized image data on the display part 4, as shown in FIG. 8, and the synthesis is to combine the object instructing information, other instructing information, and the infrared thermal image, which is displayed at different areas and does not overlap each other or does not have overlapping. Other instructing information may be a specified amount of object information, process information, a sequence, or instructing information such as a date or battery capacity to be displayed by the display part 4.

The object instructing information acquired according to the object information may be acquired according to the whole of the object information or the specified part information, and the information for acquiring the object instructing information in the object information may be predetermined. The serial numbers of the sequence to which the object information corresponds may be displayed or not.

The control part 10 as a process counting part is used for counting the photographing process information, such as process information 803 displayed in the display interface 801 and process information 804 displayed in the display interface 802, according to the amount of the object information (the determined object information when a task is determined, or according to serial numbers of a sequence) stored in the information storing part and the present designated special object information. In FIG. 8, the serial numbers of the sequence of the specially designated object information are displayed, and the serial number of the sequence and the sum "15" of the displayed object information may form the process information.

In step S107, the control part 10 determines whether there is record instructing operation. If no, step S108 is performed. When a user photographs a corresponding object according to the object instructing information "substation 1 equipment area 1 equipment I phase C" in the display interface 801 after determination via the cognition of the corresponding object or inspection of the equipment signboard. The object instructing information includes the information representing the identity of the object. When the button representing record such as the record key 01 of the operation part 11 is pressed, the record instructing operation is sent. When the control part 10 detects the record instructing operation, step S109 is performed. In addition, even if there is no record instructing operation from the operation part 11, the control part 10 may control the step S108 to be performed automatically based on other specified record conditions, for example, when satisfying a specified time interval is determined, when a temperature value of a thermal image exceeds a specified threshold value, or when trigger signals of other sensors connected with the thermal imaging device 13 are detected. The specified record condition includes that the record may be performed when other specified conditions are satisfied at the same time, such as satisfying the specified time interval or the temperature value of the thermal image exceeding the specified threshold value, even if there is the record instructing operation of the operation part 11. Obviously, the specified record condition may be different conditions configured in advance.

In the step S108, the record is performed.

In response to the record instructing operation or according to the specified record condition, the control part 10 as a record part records the specified infrared data associated with information related to the designated special object information. Then, the step S109 is performed.

The infrared data is the thermal imaging data acquired by the photographing part via photographing and/or data acquired after specified processing for the thermal imaging data acquired by the photographing part via photographing.

The specified infrared data may be the thermal imaging data (frame) acquired by signals read by an infrared detector at the moment (or the later specified moment) for responding to the record instructing operation or determining that the specified record condition is satisfied, the specified thermal imaging data (frame) in the multi-frame thermal imaging data temporarily stored in the temporary storage part 6 at the moment (or the later specified moment) for responding to the record instructing operation or determining that the specified record condition is satisfied, the data acquired after specified processing for the above thermal imaging data (the specified processing may be modification, interpolation, pseudo-color, temperature value conversion, pixel reduction, compression, or a combination thereof), the multi-frame thermal imaging data of the record specified amount, the thermal imaging data (frame) acquired after specified processing for the specified amount of the multi-frame thermal imaging data, such as one frame of the thermal imaging data acquired after integral operation for the multi-frame thermal imaging data stored in the temporary storage part 6, or one of the infrared data acquired in the above or a combination thereof, such as recording a temperature vale of each pixel acquired by the thermal imaging data and image data of the infrared thermal image at the same time.

In detail, in one embodiment, in response to the record instructing operation of the operation part 11, the control part 10 controls to allow the infrared detector to read signals to acquire the thermal imaging data, to allow the image processing part 2 to perform specified thermal imaging data compression processing for the thermal imaging data or to perform compression after specified processing such as modification or interpolation for the thermal imaging data, and to allow the information related to the designated special object information in the temporary storage part 6 to be associated with the compressed thermal imaging data further to generate a thermal image file record in the storage card 8, thus to end the processing. In addition, the compression may be performed after the information is attached.

The information related to the designated special object information may be all or part information of the object information as the special object information, which may record the information representing the identity of the object such as "substation 1 equipment area 1 equipment I phase C", may record "equipment area 1 equipment I phase C", or may record the sequence information attached in the object information, or may be other information in the object information which is not used for generating the instructing information, for example, the object information may include information such as other numbers or models, which may not be displayed and still stored.

Figure 10:
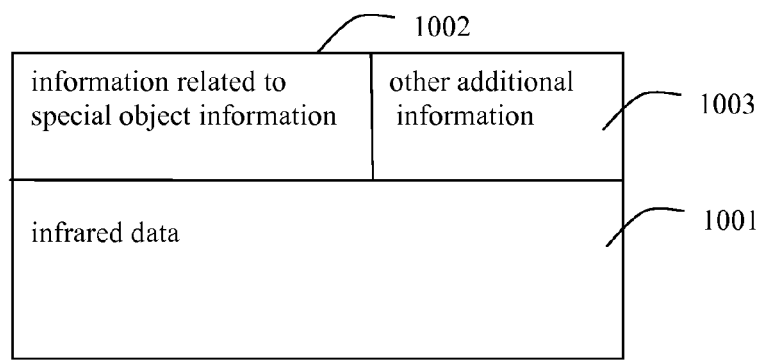
FIG. 10 is a schematic diagram showing a data structure of a record thermal image file according to one embodiment.
Figure 11:
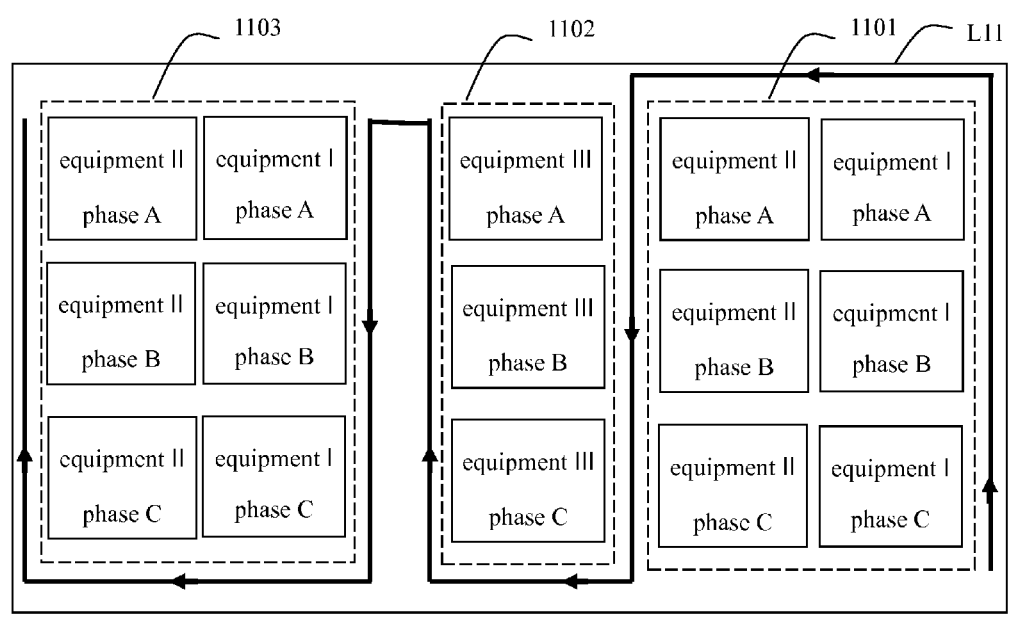
FIG. 11 is a schematic diagram showing object distribution in equipment areas 1, 2, and 3 in a substation 1 and a photographing route of a sequence of objects according to the first embodiment.
Figure 12:
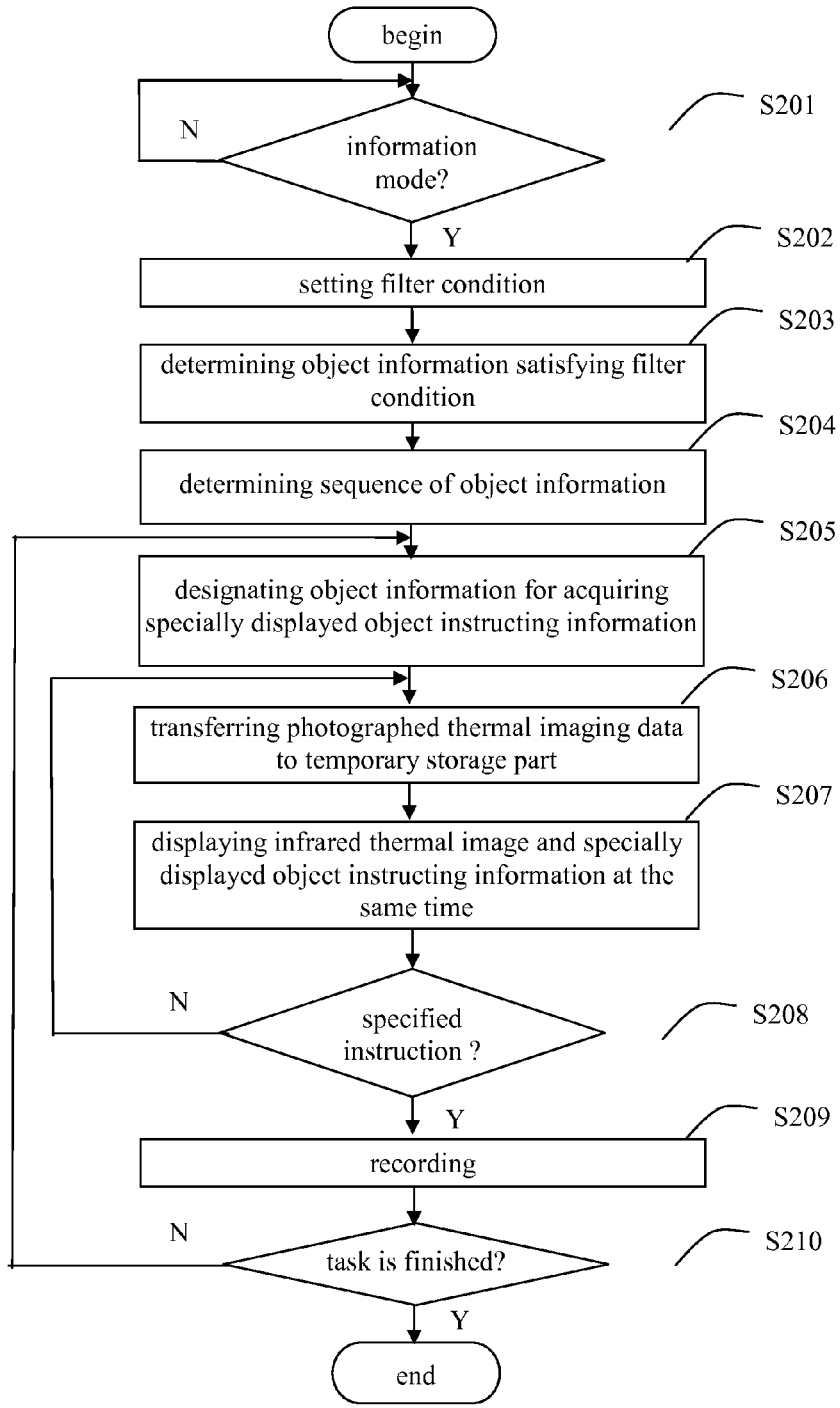
FIG. 12 is a flow chart showing an information mode according to another embodiment.

According to one embodiment of the associated record, the information related to the designated special object information is used as additional information of the infrared data in a specified format, according to a schematic diagram of a structure of a thermal image file as shown in FIG. 10. The infrared data 1001 is the thermal imaging data read from the infrared detector and acquired after compression at the moment in response to the record instructing operation or according to the specified record condition. The information 1002 related to the special object information is the object information representing "substation 1 equipment area 1 equipment I phase C". Other additional information 1003 may be photographing time or parameters related to the photographing, such as ambient temperatures or distances.

In addition, in the associated record processing, the information related to the special object information may be record to an information file or index file associated with the thermal image file. The control part 10 can generate the information file or the index file. In addition, a file name of the thermal image file can be generated according to the special object information. The record part includes a file name generating unit for generating a file name of a thermal image file. The file name at least includes the information related to the designated special object information, such as, the generated file name of the thermal image file: substation 1 equipment area 1 equipment I phase C.jpg. However, the stored attribute information without classifying is inconvenient for subsequent batch processing, and the computer is difficult to identify mixed characters. Preferably, the file name including the classified information may be generated after information classification according to the classified information in the object information, for example: substation 1-equipment area 1-equipment I-phase C.jpg generated according to specified attribute information may be combined with the time information "20120223" to generate the file name: substation 1-equipment area 1-equipment I-phase C-20120223.jpg. The separating mode "-" may be used to realize the classification of the attribute information. The essence of the associated record is to record information needed by the subsequent batch processing and analysis. The file name includes the object information, facilitating examination of the users. The discernible file name including the specified classified information can be generated according to the classified information in the object information, convenient for reading and identifying the classified information in the file name during the subsequent batch processing and analysis.

Preferably, the classified information in the file name may include the information representing the identity of the object and may correspond to the object to be photographed.

In the step S109, the control part determines whether there is switch instructing operation. If no, return to the step S105, representing the collective display of the object instructing information and the dynamic infrared thermal image (continuously synthesized). If there is switch instructing operation, step S110 is performed.

A user uses the specially displayed object instructing information "substation 1 equipment area 1 equipment I phase C" as the instructing information of the present object, thus to examine and photograph the corresponding object.

The user finishes the photographing of the corresponding object according to the object instructing information "substation 1 equipment area 1 equipment I phase C" in the display interface 801 in FIG. 8, and then the user presses buttons representing the switch such as the switch key 02 of the operation part 11, thus to realize the switch instructing operation via one-key operation. In the embodiment, the users are free of watching the object information as shown in the display interface 801 to select or enquire, and the operation is simple.

In addition, even if there is no switch instructing operation of the operation part 11, the control part 10 may control to perform the step S110 automatically based on the specified switch condition, such as, when satisfying a specified time interval is determined, when a temperature value of a thermal image exceeds a specified threshold value, or when trigger signals of a device such as other sensors connected with the thermal imaging device 13 are received. The specified switch condition may include that, the switch designated processing may be performed when other specified conditions are satisfied at the same time, such as satisfying the specified time interval or the temperature value of the thermal image exceeding the specified threshold value, even if there is the switch instructing operation of the operation part 11. Obviously, the specified switch condition may be different conditions configured in advance.

In the step S110, the control part 10 determines whether the task is finished.

The control part 10 determines whether the last object information in the sequence is designated. If no, return to the step S104, and at that moment, the designated special object information is switched according to the sequence. If yes, the information mode at this time is end, and the letters "the task is over" may be displayed on a screen. Then, return to a standby state of the thermal imaging device, to wait for operation of the users to enter into other modes. In addition, a specified sequence starting point such as a sequence starting point may be switched thus to perform cyclic photographing.

In detail, in one embodiment, the information designating part (the control part 10) adds one to the serial number of the sequence, to which the special object information designated before switch corresponds, and then determines whether the last one in the sequence is finished. If no, the object information, to which the serial number of the sequence acquired after the serial number of the sequence is added to one corresponds, is designated as the special object information. If yes, log out. In addition, it is not necessary to determine whether the last object information in the sequence is designated, and it may not be determined. When the switch instructing operation is received every time, the object information, to which the serial number of the sequence acquired after the serial number of the sequence is added to one corresponds, is found and designated as the special object information. When it is not found, one is continuously added, and the information mode is end, until the specified time is exceeded or until the control part 10 receives the logout instruction.

In the embodiment, return to the step S104. In response to the switch instructing operation or according to the specified switch condition, the information designating part switches the designated special object information based on the sequence of the object information determined by the sequence determining part, that is, to switch the object information designated as the special object information.

To switch the designated special object information, in one preferred embodiment, the information designating part switches the single object information designated as the special object information, from the single object information designated as the special object information before switch, to the object information which is the next to the object information designated as the special object information in the sequence (when there is a task determining step, it is a sequence of the object information determined by the task determining part) before switch. For example, in the embodiment, the single object information designated as the special object information may be switched from the single object information "substation 1 equipment area 1 equipment I phase C" designated as the special object information before switch, to the object information "substation 1 equipment area 1 equipment I phase B" which is the next to the object information "substation 1 equipment area 1 equipment I phase C" designated as the special object information in the sequence before switch.

The display controlling part controls to allow the display part to display the infrared thermal image generated by the thermal imaging data and simultaneously to display the object instructing information acquired according to the special object information switched and designated by the information designating part in a special display mode. As shown in a display interface 802, the specially displayed object instructing information "substation 1 equipment area 1 equipment I phase B" is switched. The process information 803 displayed in the display interface 801 changes to the process information 804 displayed in the display interface 802. Then, the user can photograph the corresponding object according to the specially displayed object instructing information "substation 1 equipment area 1 equipment I phase B". Obviously, then when the record instructing operation is performed again, since the information designating part switches the designated special object information, in response to the record instruction, the record part is used for recording the specified infrared data associated with the information "substation 1 equipment area 1 equipment I phase B" related to the designated special object information after switch. Thereby, the users can easily photograph along a photographing route L11 as shown in FIG. 11, without missing the objects.

In addition, the information designating part switches the single object information designated as the special object information, from the object information designated as the special object information before switch, to the object information which is the previous one of the object information designated as the special object information in the sequence before switch. The switch based on the sequence may be performed in a proper sequence or an inversed sequence, and the switch may be set according to the proper sequence or the inversed sequence.

In addition, when the information designating part designates two or more adjacent object information in the sequence as the special object information, the information designating part switches a specified amount of the adjacent object information in the sequence designated as the special object information, from the specified amount of the adjacent object information in the sequence designated as the special object information before switch, to a specified amount of the adjacent object information in the sequence with the origin which is the next to the object information designated as the special object information in the sequence before switch.

For example, when "substation 1 equipment area 1 equipment I phase C", "substation 1 equipment area 1 equipment I phase B", and "substation 1 equipment area 1 equipment I phase A" is designated at the same time, in response to the switch instructing operation, "substation 1 equipment area 1 equipment II phase A", "substation 1 equipment area 1 equipment II phase B", and "substation 1 equipment area 1 equipment II phase C" is switched and designated as the special object information.

In addition, when the information designating part designates two or more adjacent object information in the sequence as the special object information, the switch may be performed according to an inversed sequence.

In the embodiment, a small amount of the object information is described. In practical infrared detection, the number of the objects is large, and the embodiment of the invention can make remarkable achievements.

Similarly, for complex equipment or multi-angle photographing situations, related object information may be prestored for the objects (such as units or angles) photographed singly, and then be sequenced, thereby avoiding omissions of the photographing parts.

In the embodiment, the information mode includes the sequencing factor setting step (the step S102). However, the invention is not limited, and the step S102 may not be necessary. The sequence of the object information may be determined according to the default sequencing factor.

According to the above, based on the prestored object information, the sequence of the object information is determined based on the sequencing factor. Then, the special object information is designated, and the infrared thermal image is displayed together with the specially displayed object instructing information on the display part. In the embodiment, the object information includes the information representing the position (such as a substation, an equipment area) of the object, the type (such as a transformer, a switch, which are types of power equipment), the number (such as a phase) and so on, and the displayed object instructing information includes the information representing the identity of the object, which is provided for a user to determine the object to be photographed. The users can regard the specially displayed object instructing information as the present object instructing information, and determines the corresponding object via cognition of the object or inspection of the equipment signboards before photographing, thereby reducing incorrect photographing. Then, the designated special object information is switched according to the determined sequence, to specially display the object instructing information according to the sequence. Thus, the user can easily photograph along the photographing route L11 as shown in FIG. 11, thereby greatly reducing incorrect routes or disorder routes and avoiding omissions, further to improve the photographing speed and to reduce the working strength. By displaying the counted photographing process information, the users can arrange the photographing process reasonably. In brief, the first embodiment is one preferred embodiment. Any product in the embodiment of the invention may be not necessary to achieve all of the advantages at the same time.

Embodiment Two

In this embodiment, the flash memory 9 of the thermal imaging device 13 with the same structure as shown in FIG. 1, stores a control program for setting a filter condition, a control program for determining object information according to the filter condition, and a control program for continuously recording and switching the designated special object information in response to specified instructing operation or according to a specified condition. A scene of infrared detection for power equipment in an equipment area 1 (1101), an equipment area 2 (1102), and an equipment area 3 (1103) in a substation 1 as shown in FIG. 11 is taken for example. Different from the first embodiment, in this embodiment, a user may divide a photographing task into a plurality of subtasks according to the filter condition, and then may sequence the object information in the subtask, finally to photograph. Suppose a user photographs the objects in the equipment area 1 first, the embodiment is described according to FIG. 12 to FIG. 17.

In step S201, the control part 10 continuously monitors if a user selects an information mode via the operation part 11. If yes, step S202 is performed.

In the step S202, a filter condition is set.

Figure 13:
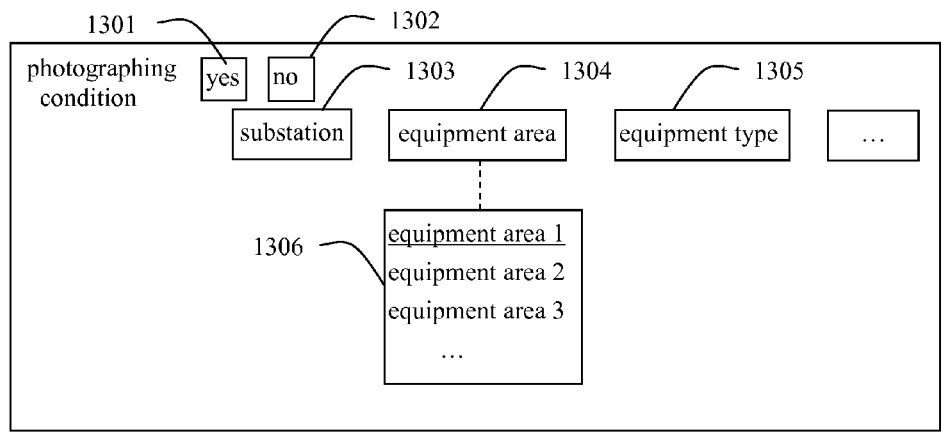
FIG. 13 is a schematic diagram showing a setting interface of a filter condition according to one embodiment.

The control part 10 controls to allow the display part to display a setting interface as shown in FIG. 3. When the user selects a filter condition option 303, then the display part 4 displays a filter condition setting interface as shown in FIG. 13, and the user sets and determines the filter condition. Then, when the selection of the determining option 300 is detected, step S203 is performed.

A task setting part is used for users to set a filter condition, and the filter condition is composed of keywords related to the filter condition and a filter logic relation.

The task setting part includes a keyword determining unit, a logic determining unit, and a filter condition generating unit. The keyword determining unit is used for determining the keywords related to the filter condition. The logic determining unit is used for determining the filter logic relation of the keywords related to the filter condition. The filter logic relation may be a filter true or false relation of one keyword, or a combination of an AND-OR-NOT logic relation among a plurality of keywords and the filter true or false relation. The filter condition generating unit is used for generating the filter condition according to the keywords related to the filter condition and the specified filter logic relation.

The keyword related to the filter condition may be one keyword or a plurality of keywords. The multiple keywords include a condition representing a keyword range, such as a number range, a letter range, a sequence range, and a time range. In addition, when the objet information includes different information related to the object, such as an attribution unit, a classified grade (such as a voltage grade or an importance grade), a model, a manufacturer, performance and characteristics, a passed photographing or repairing record, a manufacturing date, or a service life, the filter condition may be set by determining the keyword therein. However, the above information may not be used for generating the specially displayed object instructing information.

The keyword determining unit is used for determining keywords related to the filter condition. For example, the keywords related to the filter condition may be determined according to the following one or more embodiments.

For example, the keywords may be prestored for selection, and the keywords related to the filter condition may be determined based on selection of a user.

For example, one or all of the keywords related to the filter condition may be default.

For example, a user may key in the keywords, and the keywords keyed in by the user may be determined as the keywords related to the filter condition.

For example, a selection option of keyword attributes may be provided for selection, and based on the keyword attribute selected by a user, the keyword satisfying the keyword attribute may be determined as the keyword related to the filter condition. Thereby, when part of the object information includes attribute information of a specified attribute, and other object information does not include the attribute information of the specified attribute, the object information may be filtered conveniently.

In one preferred embodiment, based on the object information stored in the information storing part, the keyword of the attribute information of the specified attribute in the object information is enquired and acquired. Based on selection of a user, the keyword related to the filter condition may be determined.

In detail, the control part 10 controls to allow the display part 4 to display a filter condition setting interface as shown in FIG. 13, with a substation 1303, an equipment area 1304, and an equipment type 1305, which are configured as keyword menu options representing keyword enquires of the attribute information of the specified attribute. When the information storing part stores the object information as shown in FIG. 5, based on an equipment area 1304 selected by a user according to "equipment area 1" photographed at this time, the control part 10 enquires the object information stored in the information storing part to acquire keywords "equipment area 1, equipment area 2, equipment area 3, . . . " of the attribute information of the specified attribute (the equipment area), thus to allow to display a list 1306, and by selecting "equipment area 1" therein by the user, the keyword determining unit determines "equipment area 1" as the keyword related to the filter condition. In the embodiment, the display part 4, the operation part 11, and the control part 10 are as an example of a task setting part. However, when there are more types of the keywords of the attribute information of the object information, the operation according to this embodiment may be complicated.

In another preferred embodiment, the keyword determining unit is used for determining a keyword enquiring condition, used for enquiring and acquiring the keyword of the attribute information of the specified attribute in the object information satisfying the keyword enquiring condition, based on the object information stored in the information storing part, and used for determining the keyword related to the filter condition based on selection of a user. The keyword enquiring condition may be one or more keywords related to the filter condition determined before.

Figure 14:
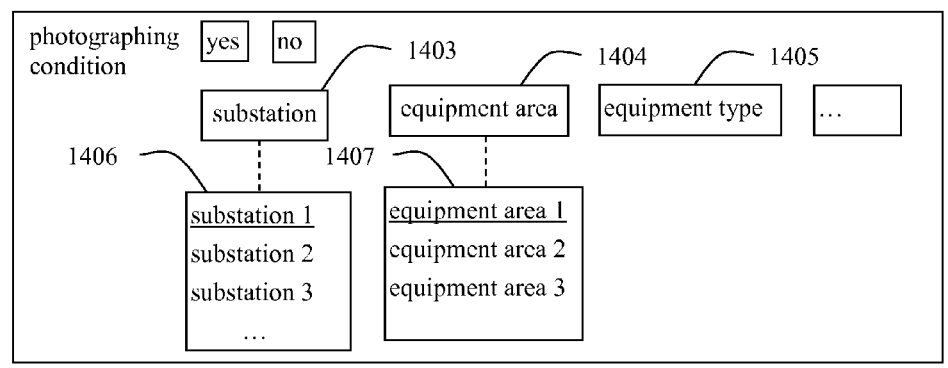
FIG. 14 is a schematic diagram showing a setting interface of the filter condition according to another embodiment.

When the information storing part stores the object information as shown in FIG. 15, the object information of other substations is included. The control part 10 allows the display part 4 to display a filter condition setting interface as shown in FIG. 14 during display setting operation. When a user selects a substation 1403 via the operation part 11, the control part 10 enquires a keyword of the attribute information of the substation attribute, based on the object information stored in the information storing part, thereby allowing to display a list 1406. When the user selects "substation 1" therein, the control part 10 determines "substation 1" as the keyword related to the filter condition. Then, when the equipment area 1404 is selected, the control part 10 determines "substation 1" selected by the user as the keyword enquiring condition, and enquires a keyword of the attribute information of the equipment area attribute of the object information satisfying "substation 1", thereby allowing to display a list 1407 "equipment area 1, equipment area 2, equipment area 3". The user may select the equipment area "equipment area 1". The control part 10 determines "substation 1" and "equipment area 1" as the keywords related to the filter condition. Obviously, the number of the keywords for selection may be simplified by this way.

The logic determining unit is used for determining the filter logic relation of the keywords related to the filter condition. The filter logic relation may be the filter true or false relation when the keyword related to the filter condition is one single keyword, or a combination of the AND-OR-NOT logic relation between the multiple keywords and the filter true or false relation when the keywords related to the filter condition are a plurality of keywords. The filter logic relation may be default or may be determined according to settings of the users.

In one embodiment of one single keyword, when the keyword related to the filter condition is the single keyword "equipment area 1" as shown in FIG. 13, the options "yes" 1301 and "no" 1302 of a photographing condition, are used for setting the filter true or false relation. When "yes" is selected, the filter condition generated by the keyword "equipment area 1" combined with the option, is used for subsequently finding and determining the object information satisfying "equipment area 1" as a photographing task. When "no" is selected, the filter condition generated by the keyword "equipment area 1" combined with the option, is used for subsequently finding and determining the object information which does not satisfy "equipment area 1".

In the embodiment, the logic determining unit determines the filter true or false relation as "yes" according to the default filter true or false relation "yes". Then, when the user performs determination via the operation part 11, the filter condition generating unit (the control part 10) combines the default filter true or false relation "yes" with the keyword "equipment area 1" selected by the user, to generate the filter condition. When the task is determined, the object information satisfying the keyword "equipment area 1" is found to be as the determined object information.

In one embodiment of multiple keywords, when the keywords related to the filter condition are "substation 1" and "equipment area 1" as shown in FIG. 14, the logic determining unit determines the filter true or false relation as "yes" according to the default filter true or false relation "yes", and the logic determining unit determines the logic relation between the keywords "substation 1" and "equipment area 1" as "AND" according to the default logic relation (the relation between keywords of different attributes is "AND") "AND". Then, when a user performs determination via the operation part 11, the filter condition generating unit (the control part 10) combines the keywords "substation 1" and "equipment area 1" related to the filter condition with the default logic relation "AND" and the default filter true or false relation "yes", thus to generate the filter condition. When the task is determined, the object information satisfying the keywords "substation 1" and "equipment area 1" is found to be as the determined object information. However, the invention is not limited thereto.

The logic determining unit may be operated by users to set the logic relation (not shown) of the keywords.

When the setting of the filter condition is finished, the user may perform determination via the enter key of the operation part, and the generated filter condition is record in the temporary storage part 6 or the flash memory 9 (such as, generating configuration files) for subsequent use. Step S203 is performed.

In the step S203, the task determining part is used for determining the object information from the object information stored in the information storing part. The object information designated as the special object information is from the determined multiple object information, and it may be the object information included by the photographing task. For example, "substation 1" and "equipment area 1" may be as the filter condition, and when the information storing part stores the object information as shown in FIG. 15, the object information satisfying the keywords "substation 1" and "equipment area 1" may be found to be as the determined object information (such as the object information in FIG. 16).

In step S204, a sequence of the object information is determined.

Figure 17:
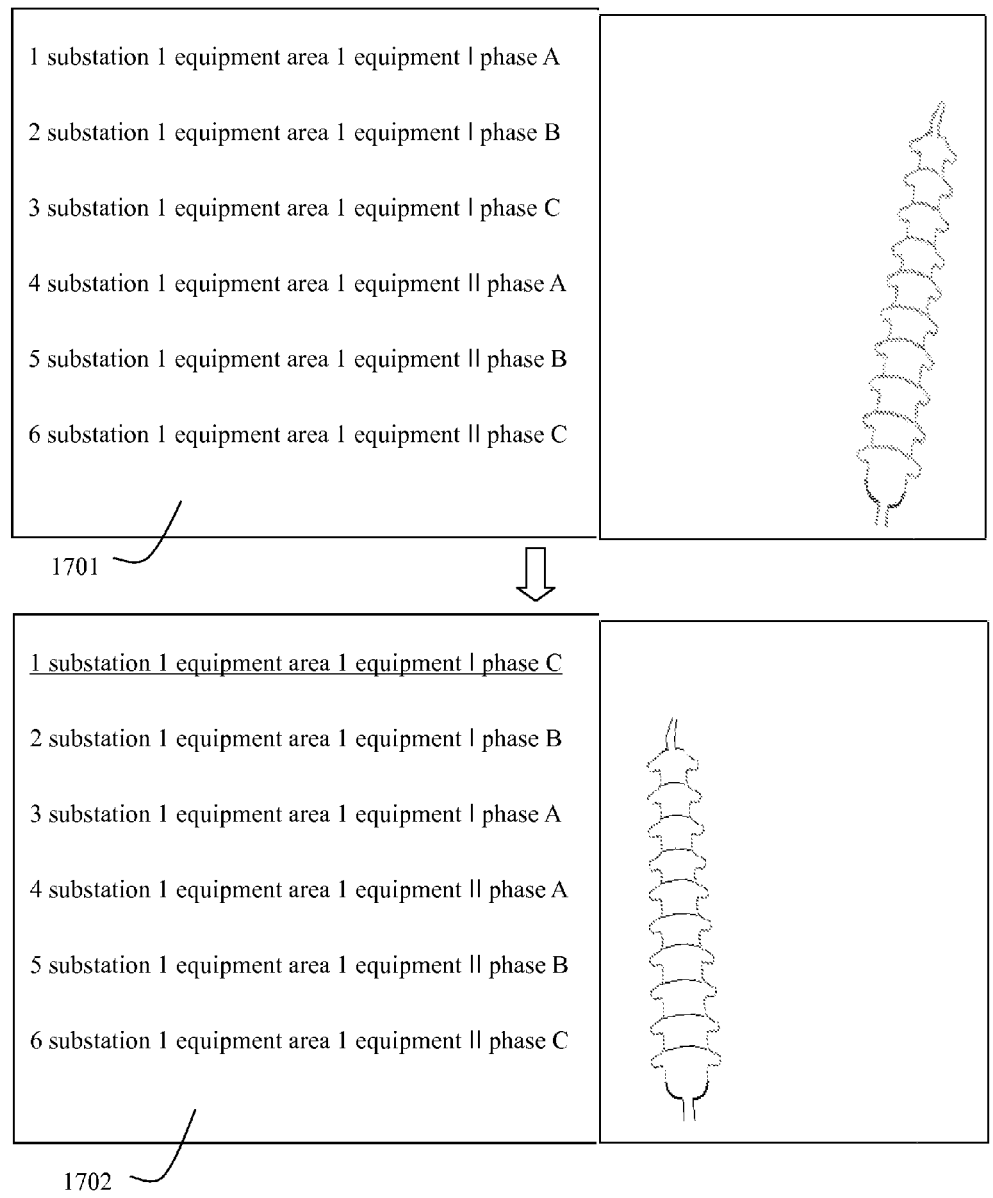
FIG. 17 is a schematic diagram showing a display interface of a sequence before and after adjusting.

In the embodiment, the control part 10 controls to display the object instructing information acquired by the specified amount of the object information according to a default sequencing factor on a specified position of the display part 4, as shown in 1701 in FIG. 17. Then, a user adjusts the sequence of the displayed object instructing information via dragging operation through a cross key or a touch screen. In addition, the information such as numbers representing the sequence may be keyed in. Thereby, the object instructing information and the sequence as shown in 1702 in FIG. 17 is acquired. In this embodiment, in response to predetermined operation for adjusting the sequence of the object instructing information displayed on the display part, the sequence determining part determines the sequence of the object information to which the object instructing information corresponds.

In step S205, the special object information is designated.

When the sequence adjustment is finished, the user selects the object instructing information "substation 1 equipment area 1 equipment I phase C" as shown in 1702 in FIG. 17. The control part 10 designates the object information to which the object instructing information corresponds, as the special object information, and step S206 is performed.

In the step S206, the thermal imaging data acquired by the photographing part 1 is transferred to the temporary storage part 6. The image processing part 2 performs pseudo-color processing for the thermal imaging data acquired by the photographing part 1 to acquire the image data of the infrared thermal image, and the image data is stored in the temporary storage part 6.

In step S207, the object instructing information acquired by the special object information and the infrared thermal image is displayed on the display part 4 at the same time.

In step S208, the control part determines whether there is specified instructing operation. If no, the steps S206 to S208 are repeated. If yes, step S209 is performed.

The user finishes the photographing of the corresponding object according to the object instructing information "substation 1 equipment area 1 equipment I phase C" in a display interface 1702, and then the user presses the switch key 02 (configured as buttons representing record and switch operation) of the operation part 11, thus to realize the record and switch operation via one-key operation. In the embodiment, the users are free of watching the object instructing information as shown in the display interface to select or enquire, and the operation is simple.

In addition, even if there is no specified instruction from the operation part 11, the control part 10 may control to perform the following step automatically based on the specified condition, such as, when satisfying a specified time interval is determined, when a temperature value of a thermal image exceeds a specified threshold value, or when trigger signals of a device such as other sensors connected with the thermal imaging device 13 are detected. The specified condition may include that, the following step may be performed when other specified conditions are satisfied at the same time, such as satisfying the specified time interval or the temperature value of the thermal image exceeding the specified threshold value, even if there is operation of the operation part 11 such as the record instructing operation. Obviously, the specified condition may be different conditions configured in advance.

In step S209, the record is performed.

In response to the specified instruction of the operation, the control part 10 records the specified infrared data associated with the information related to the designated special object information "substation 1 equipment area 1 equipment I phase C". The record processing is similar to that in the first embodiment. Therefore, it is not repeated. Then, step S210 is performed.

In the step S210, the control part 10 determines whether the task is finished.

If finished, the information instructing photographing mode is end, and return to a standby state of the thermal imaging device, to wait the users for setting and photographing "equipment area 2" and "equipment area 3" again. If not finished, return to the step S205, and according to the sequence, the object information "substation 1 equipment area 1 equipment I phase C" designated as the special object information before switch is switched to "substation 1 equipment area 1 equipment I phase B".

In the embodiment, the task is set after the information mode is entered. However, the invention is not limited. The task may be set first, for example, the information mode may be entered after generating a new data file. In addition, the task may be performed for several times, and different combinations may acquire more embodiments.

In addition, in the embodiment, there are one single button (such as the switch key), configured to represent the record instructing operation and the switch instructing operation, and a corresponding control program, and in response to the specified instructing operation (such as the same operation) of the button or a specified condition, the control part 10 continuously controls the record processing in the step S209 and the switch processing in the step S210, thereby simplifying the operation. In the embodiment, the record processing is performed first, and then the switch processing is performed. For example, "substation 1 equipment area 1 equipment I phase C" may be record first, and then may be switched to "substation 1 equipment area 1 equipment I phase B". However, the switch processing may be performed first, that is, to switch to "substation 1 equipment area 1 equipment I phase B", and then the special object information "substation 1 equipment area 1 equipment I phase C" designated before switch is record associated with the specified infrared data. In response to the record instructing operation or according to the specified record condition, the record part is used for recording the specified infrared data associated with the information related to the designated special object information, which also includes the above situation.

To correctly describe the interior operating principle and steps, a step-by-step described mode is used in the embodiment. However, in a practical implementing process, to facilitate operation of users, different embodiments may be used to optimize the operation. For example, based on the same (time) operation and/or according to the specified condition, the record and switch action may be performed continuously, allowing the operation to be more convenient, the same operation may be the same operation action of the same button, and the same operation action may finish multiple steps described above (such as finishing the record instructing operation and the switch instructing operation). Different operation in the same operation of the same button may act (such as half-press and all-press), and the different operation action in the same operation may realize one or more steps described above, respectively (such as finishing the record instructing operation and the switch instructing operation, respectively, or finishing the record instructing operation and the switch instructing operation at the same time). The operation of different buttons in the specified time may act (such as finishing the record instructing operation and the switch instructing operation, respectively, or finishing the record instructing operation and the switch instructing operation at the same time). The different combination of the switch instructing operation and the record instructing operation can acquire more embodiments. Further, the operation is not limited to the button, and may be realized by other operating parts such as a touch screen.

In one preferred mode, there is a freeze controlling part. In response to freeze instructing operation or according to a specified freeze condition, the freeze controlling part is used for displaying an infrared thermal image in freeze-frame. For example, when a freeze key (configured to perform the freeze instructing operation) is pressed, the infrared thermal image is displayed in freeze-frame, and a user can determine the record of the infrared thermal image. Otherwise, the switch key 02 may be configured to perform freeze/determine operation (for example, there is a freeze displaying and determining step before a record step). In addition, even if there is no freeze operation of the operation part 11, the control part 10 may perform the freeze operation automatically based on other specified freeze conditions, such as when satisfying a specified time interval is determined, when a temperature value of a thermal image exceeds a specified threshold value, or when trigger signals of other sensors connected with the thermal imaging device 13 are detected. The specified freeze condition may include that, the freeze processing may be performed when satisfying other specified conditions at the same time, such as satisfying the specified time interval or the temperature value of the thermal image exceeding the specified threshold value, even if there is the freeze operation of the operation part 11. Obviously, the freeze instructing operation can be combined with the switch instructing operation and the record instructing operation to acquire more embodiments.

According to the above, the filter condition of the object information in the photographing task is set, thereby reducing the displayed redundant information, reducing the object instructing information, and facilitating sequence adjustment of the displayed object instructing information. Further, the photographing route is determined in advance, thereby reducing strength, improving efficiency, and avoiding omissions of the objects in the later photographing.

Embodiment Three

In this embodiment, the flash memory of the thermal imaging device 13 with the same structure as shown in FIG. 1, stores a control program for setting a group sequence and a filter condition and a control program for determining object information according to the filter condition. A scene of infrared detection for power equipment with the type "equipment I" in an equipment area 1, an equipment area 2, and an equipment area 3 in a substation 1 as shown in FIG. 11 is taken for example. In the past, due to different detecting objectives, there is detection for the whole objects in the substation and detection for the objects of a specified type, the objects of the specified type are distributed at different equipment areas, and the users need to find the objects, causing inconvenience. Obviously, the object information may be used as the filter condition, thereby facilitating the photographing by the users.

Different from the first embodiment, three data files are stored in the storage card, as shown in FIG. 21, a data file 1 (a list 2101) includes object information related to the equipment area 1 and attached with a sequence, a data file 2 (a list 2102) includes object information related to the equipment area 2 and attached with a sequence, and a data file 3 (a list 2103) includes object information related to the equipment area 3 and attached with a sequence. To plan a photographing route with the best efficiency, a user can set the sequence among the data files according to distribution of the substation, and then may set "equipment I" as the filter condition to photograph. The embodiment is described according to FIG. 18 to FIG. 22.

In step S301, the control part 10 continuously monitors if a user selects an information mode via the operation part 11. If yes, step S302 is performed.

In the step S302, a sequencing factor among the data files is set.

Figure 18:
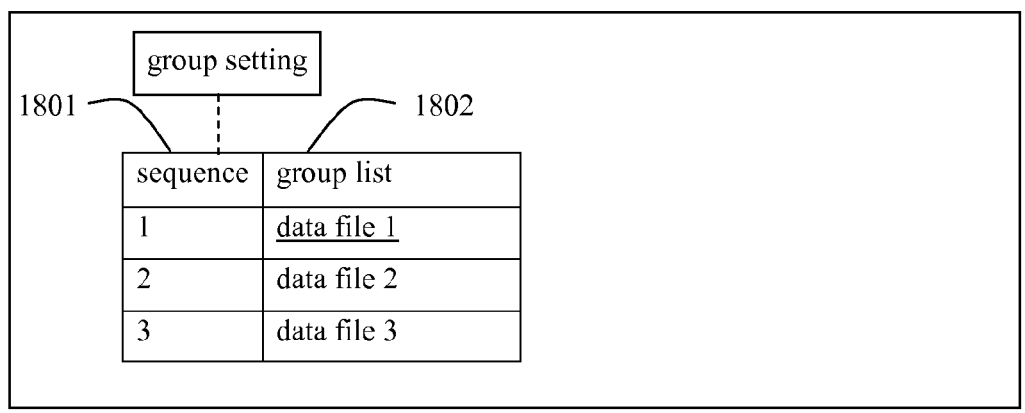
FIG. 18 is a schematic diagram showing a setting interface of a group setting interface according to one embodiment.
Figure 19:
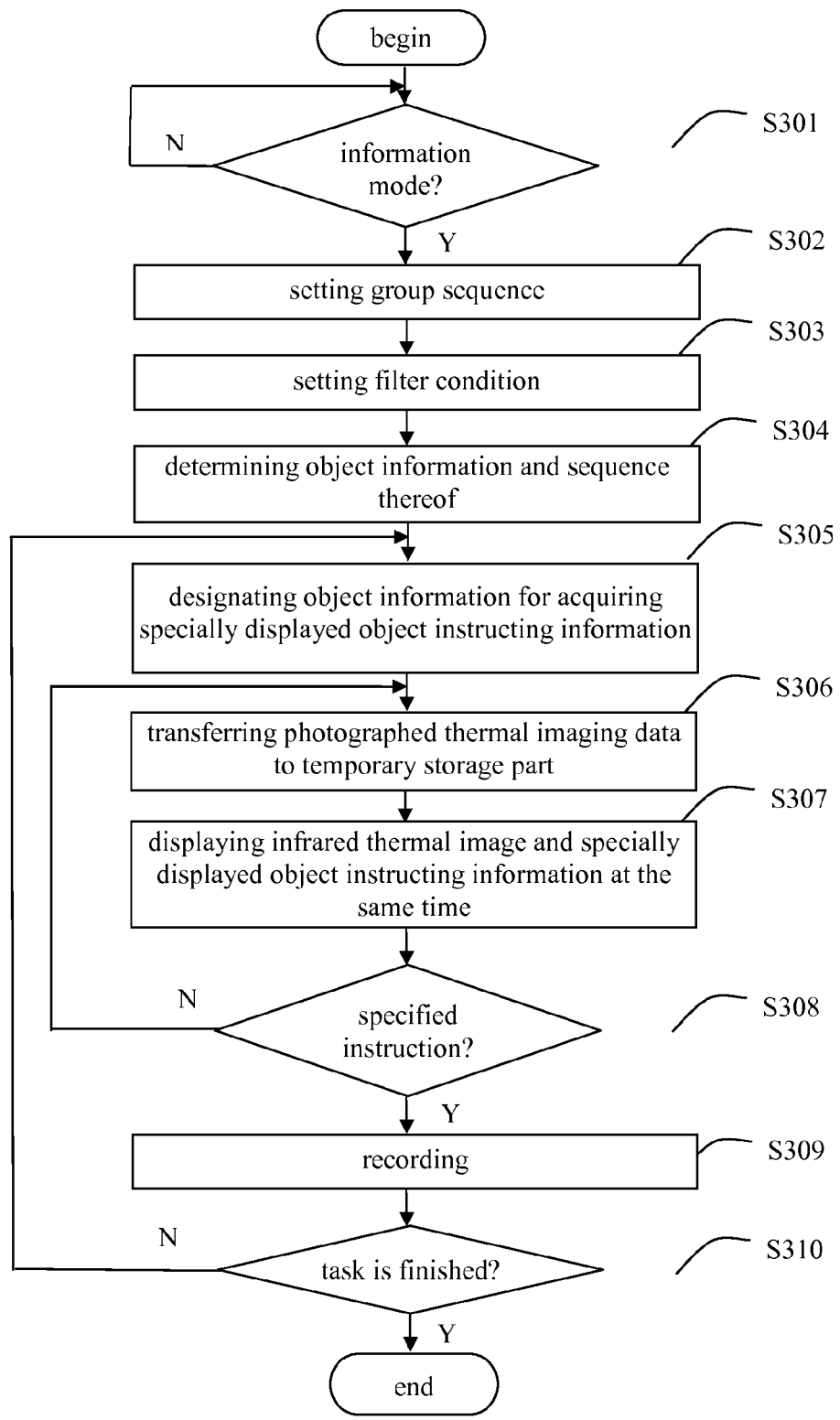
FIG. 19 is a flow chart showing an information mode according to another embodiment.

The control part 10 controls to allow the display part to display the setting menu as shown in FIG. 3. When a user selects the group setting option 301 in FIG. 3, based on the data files (groups) stored in the information storing part, a data file list 1802 as shown in FIG. 18 is displayed, and the user sets the sequencing factor (a sequence list 1801) for the data files in the list. When the setting is finished and determined, return to the setting menu in FIG. 3. When the user selects the filter condition option 303, step S303 is performed.

The information storing part is used for prestoring multiple groups of the object information. A group sequence setting part is used for setting the sequencing factor among the groups. The group mentioned here is a set of multiple object information with the same group mark, such as a data file or a file folder. In addition, when the group sequence is finished, the sequencing factor of the object information in the same group may be set or examined again.

In the step S303, the filter condition is set.

The task setting part is used for users to set the filter condition (of the object information included in a photographing task).

Figure 20:
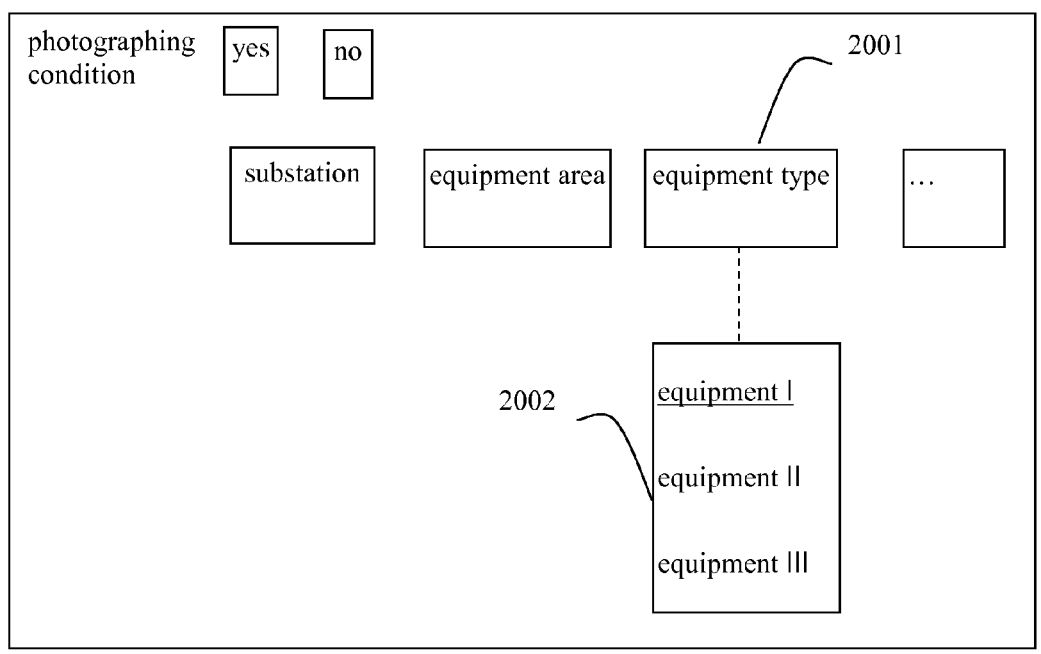
FIG. 20 is a schematic diagram showing a setting interface of the filter condition according to another embodiment.
Figure 22:
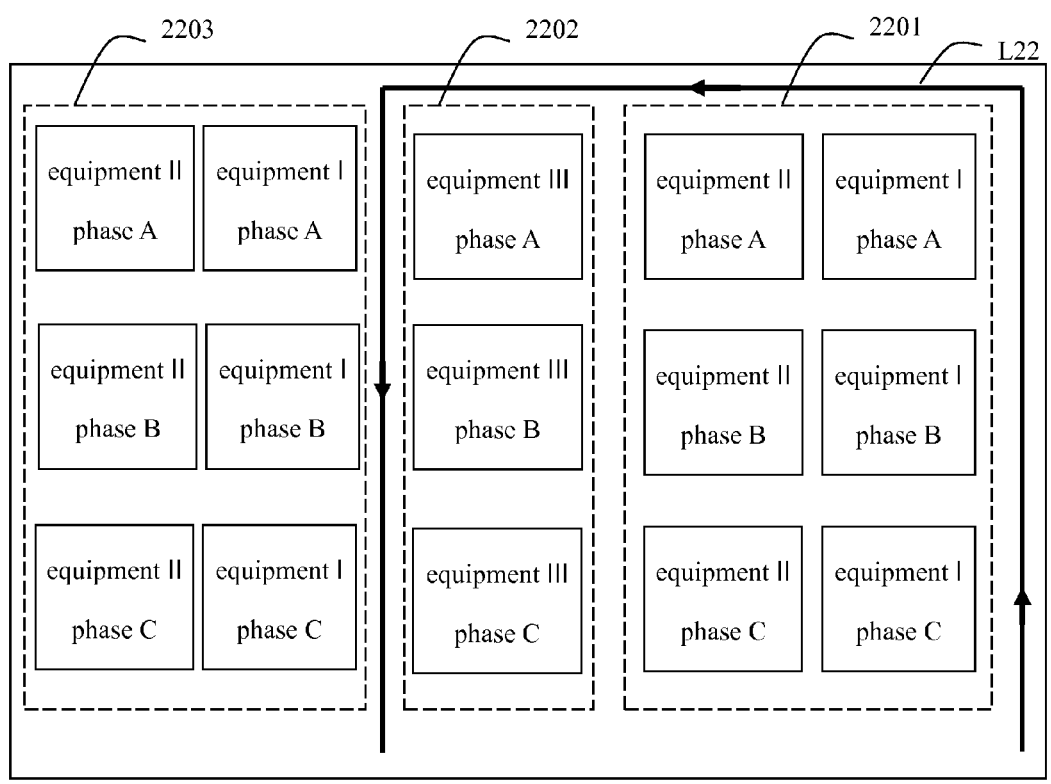
FIG. 22 is a schematic diagram showing a photographing route of a sequence according to a third embodiment.

The control part 10 allows to display a filter condition setting interface as shown in FIG. 20. In one embodiment, based on selection of an equipment type 2001 by the user according to "equipment I" photographed at this time, the control part 10 enquires the object information in the data files 1, 2, and 3 determined in the step S302, to acquire the keywords "equipment I, equipment II, equipment III" of the attribute information of the specified attribute (the equipment type), thus to display a list 2002, and generates the filter condition by combining the default filter true or false relation "yes" and the keyword "equipment I" when the user selects "equipment I". When the user finishes the setting and determines the determining option 300 in FIG. 3, step S304 is performed. In addition, the filter condition may be determined by other determining methods as mentioned in the step S202 in the second embodiment.

In the step S304, the object information and the sequence is determined.

Based on the filter condition determined in the step S303, the object information satisfying the keyword "equipment I" is found in the data files 1, 2, and 3 to be as the determined object information, and the determined object information and the sequence is displayed as an exemplary list 2104 in FIG. 21, by combining the group sequencing factor and the sequencing factor of the object information in each group set in the step S302. Compared with the data files 1, 2, and 3 before the task is determined, "equipment area 2", "equipment II", and "equipment III" are reduced, and the number of the equipment photographing task is reduced to "6". Obviously, the photographing route during the specified photographing task is simplified, thereby avoiding finding "equipment I" in "equipment area 2", and reducing the work strength.

In step S305, the special object information is designated.

The control part 10 controls to designate the object information "substation 1 equipment area 1 equipment I phase C" at the first place of the determined object information attached with the sequence, as the special object information.

In step S306, the thermal imaging data acquired by the photographing part 1 is transferred to the temporary storage part 6, the image processing part 2 performs pseudo-color processing for the thermal imaging data photographed by the photographing part 1 to acquire image data of an infrared thermal image, and the image data is stored in the temporary storage part 6.

In step S307, the object instructing information acquired according to the special object information is displayed with the infrared thermal image on the display part 4 at the same time.

In step S308, the control part determines whether there is specified instructing operation. If no, the steps S306 to S308 are repeated. If yes, step S309 is performed.

When a user finishes photographing of a corresponding object, and then presses the switch key 02 (configured as a button representing the record and switch instructing operation in the embodiment) of the operation part 11, the record and switch operation may be finished via one-key operation, and the operation is simple.

In the step S309, the record is performed.

In response to the specified instruction of the operation, the control part 10 records the specified infrared data associated with the information related to the designated object information. The record processing is similar to that in the first embodiment, and it is not described again. Then, step S310 is performed.

In the step S310, the control part 10 determines whether the task is finished.

If finished, the information instructing photographing mode is end, and return to a standby state of the thermal imaging device, to wait for the users to perform operation of other modes. If not finished, return to the step S305, the object information is switched and designated according to the determined sequence.

In this embodiment, when the user finishes photographing the equipment I in the equipment area 1, the user turns to photograph the equipment I in the equipment area 3, avoiding seeking the equipment I in the equipment area 2. The photographing route of the equipment area 1 (2201), the equipment area 2 (2202), and the equipment area 3 (2203) in FIG. 22, changes from L11 in FIG. 11 to L22 in FIG. 22.

According to the above, by setting the sequencing factor between the groups, accelerating operation for sequencing the groups is provided. By setting the filter condition, the display of the redundant information can be reduced, the displayed object instructing information is more instructive, and further the photographing route is simplified, thereby reducing strength, improving efficiency, and avoiding omissions. Obviously, when the filter conditions of different types are set, more convenience is provided for the users to photograph. If the object information includes attribute information of a history (such as past deficiencies), the users can quickly find related information of the deficient object, facilitating reexamination.

Embodiment Four

The thermal imaging device 13 with the photographing function in the above embodiment may further be applied to an infrared processing device for receiving and processing thermal imaging data from outside. In the embodiment, an infrared processing device 100 is as an example of an infrared recording device.

Figure 24:
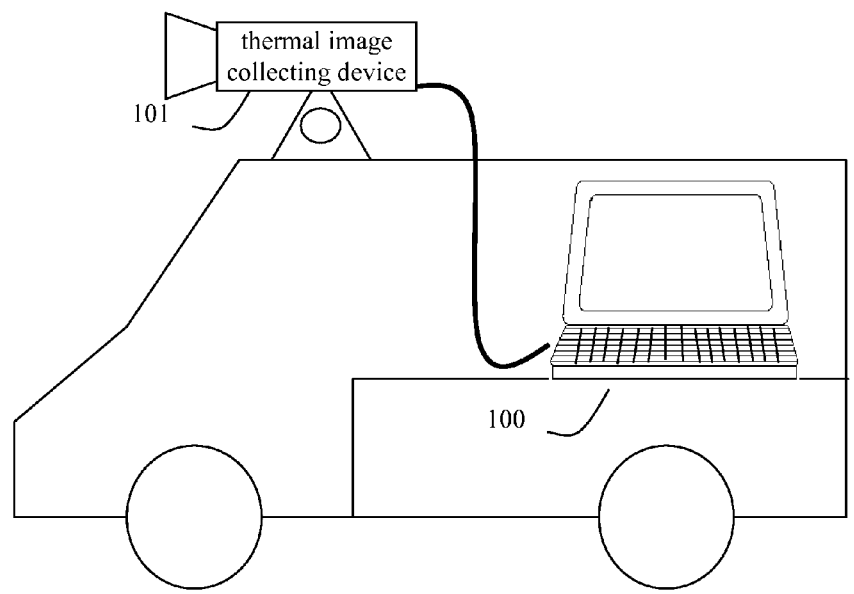
FIG. 24 is a schematic diagram showing the thermal image photographing system including the infrared processing device 100 and the infrared collecting device 101 connected with each other according to one embodiment.

In this embodiment, as shown in FIG. 24, a thermal image collecting device 101 is erect on a detection vehicle via an extension ladder, and is connected with an infrared processing device 100 via communication wires such as special-use cables, or a local area network consisted in a wired or wireless mode. The users can watch thermal images of the object via the infrared processing device 100. The thermal image collecting device 101 is connected with the infrared processing device 100 to form an infrared photographing system in this embodiment.

Figure 23:
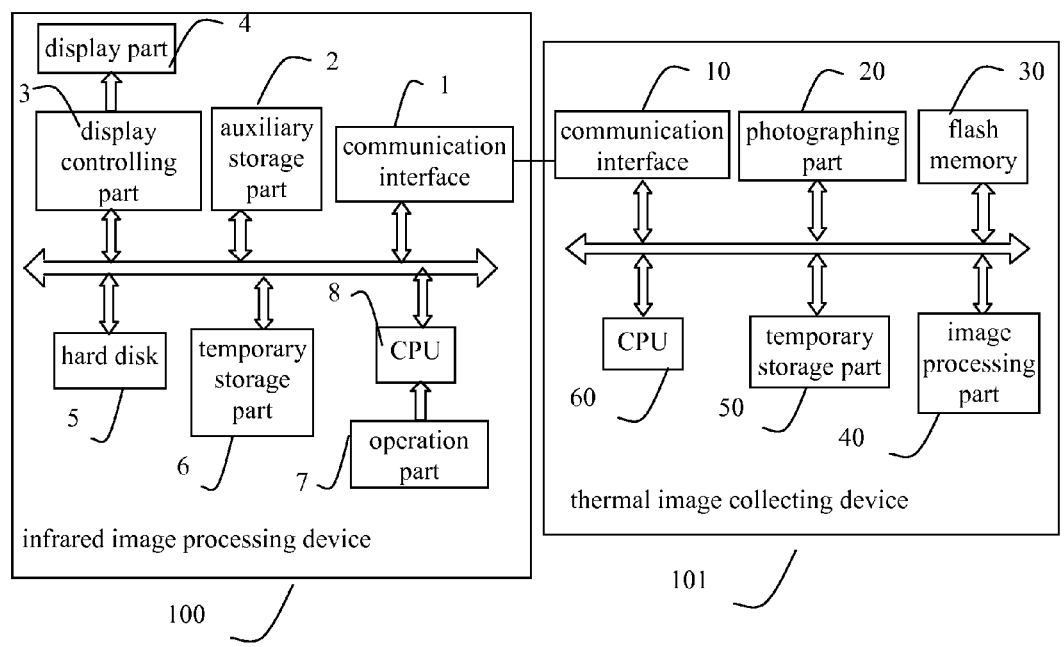
FIG. 23 is a block diagram showing a thermal image photographing system including an infrared processing device 100 and an infrared collecting device 101 connected with each other according to a fourth embodiment.

FIG. 23 is a block diagram showing an infrared photographing system including an infrared processing device 100 and the thermal imaging device 101 connected with each other.

The infrared processing device 100 includes a communication interface 1, an auxiliary storage part 2, a display controlling part 3, a display part 4, a hard disk 5, a temporary storage part 6, an operation part 7, and a CPU 8 connected with the above parts via a bus and for the whole control. The infrared processing device 100 may be a computer or a special-use processing device. The infrared processing device 100, based on the control of the CPU 8, receives thermal imaging data output by the thermal image collecting device 101 connected with the infrared processing device 100 via the communication interface 1. The communication interface 1 is used for continuously receiving the thermal imaging data output by the thermal image collecting device 101, including the thermal imaging data transferred by a relay device (the thermal imaging data output by the thermal image collecting device 101 is transferred by the relay device), and further may be used as a communication interface for controlling the thermal image collecting device 101. In the embodiment, the communication interface 1 may be different kinds of wired or wireless communication interfaces on the infrared processing device 100, such as a network interface, a USB interface, a 1394 interface, or a video interface. The auxiliary storage part 2 may be a storage medium, such as a CD-ROM or a storage card, and a related interface. The display controlling part 3 displays an image on the display part 4 according to the control of the CPU 8. The display part 4 may be a liquid display, and the infrared processing device 100 may not include a display in itself. The hard disk 5 stores programs for control and different kinds of data used in the control. The temporary storage part 6, such as a non-volatile storage i.e. RAM and DRAM, is used as a buffer storage for temporarily storing the thermal imaging data received via the communication interface 1, and is also used as a work storage of the CPU 8. The operation part 7 is used for users to operate. The CPU 8 controls the whole action of the infrared processing device 100 and performs different related processing, such as specified processing for the received thermal imaging data, i.e. modification, interpolation, pseudo-color, synthesis, compression, and decompression, which is the processing for converting to the data suitable for displaying and recording. For example, when the received thermal imaging data is compressed thermal image AD data, the specified processing may be decompression and corresponding pseudo-color processing for the thermal imaging data received by the acquiring part via the CPU 8. When the received thermal imaging data is compressed image data of the infrared thermal image, the image data of the infrared thermal image may be acquired via decompression. When the communication interface 1 receives the analog infrared thermal image, the digital image data of the infrared thermal image may be acquired after AD conversion via related AD converting circuits.

The thermal image collecting device 101 includes a communication interface 10, a photographing part 20, a flash memory 30, a temporary storage part 50, an image processing part 40, and a CPU 60. The CPU 60 controls the whole action of the thermal image collecting device 101, and the flash memory 30 stores control programs and data of different kinds used in different control. The photographing part 20 is used for acquiring thermal imaging data via photographing, the temporary storage part 50 is used for storing the processed data temporarily, the image processing part 40 may compress the photographed thermal imaging data, and the CPU 60 controls to output the processed thermal imaging data via the communication interface 10.

The structure in the thermal imaging device 13 except the photographing part 1 is generally the same with that in the infrared processing device 100. Obviously, acquiring the thermal imaging data from outside is also suitable for this embodiment. Therefore, the description of the embodiment is omitted. Obviously, the infrared processing device 100 can be used in coordination with different kinds of thermal image collecting devices with the infrared photographing function, such as different kinds of handheld thermal imaging devices.

OTHER EMBODIMENTS

Although the information mode includes settings of the filter condition and the sequencing factor in the above embodiment, the invention is not limited, the settings of the filter condition and the sequencing factor are not necessary, and the object information and the sequence may be determined based on the default filter condition or default sequencing factor.

In addition, the filter condition or sequencing factor may be set separately for subsequent use. For example, the filter condition and the sequencing factor may be set first, further to be stored as a default value or a configuration file for subsequent use, and the object information attached with the sequence may be acquired according to the filter condition and sequencing factor, such as generating a new data file, then to enter into the information mode.

In addition, one preferred mode is to set the filter condition first and then to set the sequencing factor. However, the invention is not limited. The filter condition setting step and the sequence setting step may be performed without distinction of sequence, or may be set at the same time in the same operating interface. In addition, the filter condition or the sequencing factor may be reset.

In addition, in the embodiment, the filter condition setting step, the sequence setting step, the task determining step, and the sequence determining step are described step-by-step, or may be described in an instant gradual mode. That is, when the filter condition is set, the task determining part determines the object information according to the filter condition, when the sequencing factor of the keyword is set, the sequence determining part determines the sequence of the object information determined by the task determining part, and when all of the settings are determined, such as determination of the determining option 300 in FIG. 3, a step for designating the special object information is performed.

In addition, a display unit of the display part 4 may be configured to at least one. There are a display for displaying the infrared thermal image and a display for specially displaying the object information. The display control at the same time mentioned by the display controlling part may be to display on the same display or different displays at the same time.

Preferably, the object instructing information is displayed with the continuous infrared thermal image at the same time. However, the invention is not limited thereto. For example, the display part 4 may display the dynamic infrared thermal image, and when the display instruction of the specified object instructing information displayed specially is received, the object instructing information is displayed with the frozen infrared thermal image at the same time. In addition, the object information and the infrared thermal image may be switched to display. That is, in response to a display instruction of the object information, the display controlling part displays the object instructing information acquired according to the special object information designated by the information designating part in the special display mode, and then switch operation is performed, to specially display the object instructing information after switch, to switch to display the infrared thermal image, or to perform the record processing. In addition, after the special display, blanking may be performed after displaying for specified time or based on operation of users, to avoid occupations of the display screen. In addition, in the embodiment, the switch operation may not be performed, while the users can select the multiple object information displayed according to the sequence. The information designating part designates the object information as the special object information based on selection of the user. By this way, the users can select conveniently.

Obviously, different groups of the working steps can acquire more embodiments. More embodiments may be acquired according to different combinations of the working modes.

Obviously, when the infrared recording device in the invention is as a certain part of the thermal imaging device, the display controlling part may be omitted, also forming the invention.

In the embodiments, the less object information is described. In practical infrared detection, there are many objects, and the embodiments in the invention may bring remarkable effects. In the embodiment, when the object needs to be photographed from multiple angles, the object information including the photographing angle information may be prestored, and then the sequencing factor of the photographing angle is set during sequencing.

In addition, the processing and control function of part or all elements in the embodiments of the invention may be realized via special-use circuits, general processors, or programmable FPGA. Although the function block in the drawings may be realized via hardware, software, or the combination thereof, the structure for realizing the function block may not be set in a one-for-one mode. For example, multiple function blocks may be realized via one software or hardware unit, or one function block may be realized via multiple software or hardware units.

In addition, the objects in the power industry are taken as a scene for example, and different industry of the infrared detection is also suitable.

The above description is only the embodiments of the invention, and the exemplary description is not for limiting the substantive contents of the invention. Persons having ordinary skill in the art may make other modifications and changes without departing from the scope and spirit of the invention after reading the description.

What is claimed is:

1. An infrared recording device having a processing and control function of part or all elements realized via special-use circuits, general processors, or Field Programmable Gate Arrays (FPGAs), comprising:
    an acquiring part for acquiring thermal imaging data;
    an information designating part for designating object information as special object information based on multiple object information stored in an information storing part;
    the special object information being used for acquiring object instructing information displayed specially;
    the object information being information representing identity of an object comprising a position, a type, a number of the object, or a combination thereof to uniquely differentiate multiple objects;
    a display controlling part for controlling a display part to display an infrared thermal image generated by the thermal imaging data and simultaneously to display a specified amount of object instructing information according to a sequence of object information, based on the multiple object information stored in the information storing part;
    the object instructing information acquired according to a specified amount of the object information being displayed and the object instructing information acquired according to the special object information being displayed specially in a display mode different from the display mode of other object instructing information;
    an image display area displaying the infrared thermal image and an information display area displaying a specified amount of the object instructing information being configured to facilitate simultaneous observation of the infrared thermal image and the specified amount of the object instructing information by a user;
    each object information stored in the information storing part comprising attribute information having a plurality of specified attributes;
    the object instructing information being acquired according to all attribute information or specified part attribute information of the object information;
    a task setting part for setting a filter condition based on the object information stored in the information storing part;
    a photographing task being divided into a plurality of subtasks according to the filter condition, and the object information in the subtask being then sequenced and finally photographed;
    a record part, in response to record instructing operation or according to a specified record condition, for recording specified infrared data associated with information related to the designated special object information, the infrared data being the thermal imaging data acquired by the acquiring part and/or data acquired after specified processing for the thermal imaging data acquired by the acquiring part;
    in response to switch instructing operation or according to a specified switch condition, the information designating part switching the designated special object information according to the sequence of the object information, based on the object information stored in the information storing part.

2. The infrared recording device according to claim 1, further comprising:
    the acquiring part for continuously acquiring the thermal imaging data.

3. The infrared recording device according to claim 1, wherein the specially displayed object instructing information is provided for a user to determine an object to be photographed, a unit of the object to be photographed, a photographing angle of the object to be photographed, or a combination thereof.

4. The infrared recording device according to claim 2, wherein the specially displayed object instructing information includes the information representing the identity of the object and the information representing at least one of the unit of the object and the photographing angle.

5. The infrared recording device according to claim 2, wherein based on the same operation and/or according to the specified condition, the record part is used for recording the specified infrared data associated with the information related to the designated special object information.

6. The infrared recording device according to claim 1, further comprising:
    a task determining part for determining the object information from the object information stored in the information storing part;
    the information designating part for designating the object information from the object information determined by the task determining part as the special object information;
    in response to the switch instructing operation or according to the specified switch condition, the information designating part switching the designated special object information according to the sequence of the object information, based on the object information determined by the task determining part.

7. The infrared recording device according to claim 2, further comprising:
    a task determining part for determining the object information from the object information stored in the information storing part;
    the information designating part for designating the object information from the object information determined by the task determining part as the special object information;
    the display controlling part for controlling the display part to display a dynamic infrared thermal image generated by the continuously acquired thermal imaging data and simultaneously to display the object instructing information acquired according to the specified amount of the object information according to the sequence of the object information, based on the object information determined by the task determining part, the object instructing information acquired according to the special object information being displayed in a special way different from that of other object instructing information;

the information designating part, in response to the switch instructing operation or according to the specified switch condition, for switching the designated special object information according to the sequence of the object information, based on the object information determined by the task determining part.

8. The infrared recording device according to claim 1, wherein the information related to the designated special object information includes the information representing the identity of the object or the information representing the identity of the object and the information representing at least one of a unit of the object and a photographing angle.

9. The infrared recording device according to claim 8, wherein the record part is used for generating a thermal image file according to the specified infrared data, the record part comprises a file name generating unit for generating a file name of the thermal image file, and the file name includes the information related to the designated special object information.

10. The infrared recording device according to claim 1, wherein the file name includes the classified information arranged in a classified mode or a classified information and time, and the classified information includes the classified information acquired according to the specified information of the designated special object information.

11. The infrared recording device according to claim 2, wherein the record part is used for generating a thermal image file according to the specified infrared data, the record part comprises a file name generating unit for generating a file name of the thermal image file, the file name includes the information related to the designated special object information, the file name includes a classified information arranged in a classified mode or the classified information and time, and the classified information includes the classified information acquired according to the specified information of the designated special object information.

12. The infrared recording device according to claim 10, wherein the file name at least includes the information related to a position, a type, and a number of the object, or includes the information related to the position, the type, and the number of the object, and the information related to time, a unit of the object, a photographing angle of the object, or a combination thereof.

13. The infrared recording device according to claim 11, wherein the file name at least includes the information representing the identity of the object or the information representing the identity of the object and the information representing at least one of a unit of the object and a photographing angle.

14. The infrared recording device according to claim 1, wherein the infrared recording device is a portable thermal image photographing device.

15. The infrared recording device according to claim 6, further comprising:
the task determining part for determining the object information according to a specified filter condition;
wherein a keyword related to the filter condition is an attribution unit, a classified grade, a model, a manufacturer, performance and characteristics, a passed photographing record, a repairing record, a manufacturing date, a service life, a position, an area of an object, a type, passed photographing time, a photographing angle, a unit, or a combination thereof, related to the object.

16. The infrared recording device according to claim 1, further comprising:
a sequence determining part for determining the sequence of the object information according to a specified sequencing factor;
a sequence setting part for setting the sequencing factor of the object information, the sequence setting part including a keyword determining unit for determining keywords related to the sequence and a sequencing factor determining unit for determining the sequencing factor of the keywords;
the sequencing setting part for acquiring the sequencing factor of the object information according to a sequencing factor of a first keyword or a combination of the sequencing factor of the first keyword and a sequencing factor of an auxiliary keyword.

17. An infrared recording method comprising:
an acquiring step for acquiring thermal imaging data;
a display controlling step for controlling to allow a display part to display an infrared thermal image generated by the thermal imaging data and simultaneously to display a specified amount of object instructing information according to a sequence of object information, based on the multiple object information stored in an information storing part;
the object instructing information acquired according to a specified amount of the object information being displayed and the object instructing information acquired according to the special object information being displayed specially in a display mode different from the display mode of other object instructing information;
an image display area displaying the infrared thermal image and an information display area displaying a specified amount of the object instructing information being configured to facilitate simultaneous observation of the infrared thermal image and the specified amount of the object instructing information by a user;
each object information stored in the information storing part comprising attribute information having a plurality of specified attributes;
the object instructing information being acquired according to all attribute information or specified part attribute information of the object information;
an information designating step for designating the object information as special object information based on selection of a user;
the special object information being used for acquiring object instructing information displayed specially;
the object information being information representing identity of an object comprising a position, a type, a number of the object, or a combination thereof to uniquely differentiate multiple objects;
the display controlling step for controlling to allow the display part to display the infrared thermal image generated by the thermal imaging data and simultaneously to display the object instructing information acquired according to the special object information designated in the information designating step in a special display mode;
a task setting part for setting a filter condition based on the object information stored in the information storing part;
a photographing task being divided into a plurality of subtasks according to the filter condition, and the object information in the subtask being then sequenced and finally photographed;

a recording step, in response to record instructing operation or according to a specified record condition, for recording specified infrared data associated with information related to the designated special object information, the infrared data being the thermal imaging data acquired in the acquiring step and/or data acquired after specified processing for the thermal imaging data acquired in the acquiring step;

in response to switch instructing operation or according to a specified switch condition, the information designating step switching the designated special object information according to a sequence of the object information, based on the object information stored in the information storing part.

18. The infrared recording method according to claim 17, further comprising:

a task determining step for determining the object information from the object information stored in the information storing part;

the display controlling step for displaying a specified amount of the object instructing information according to the sequence of the object information, based on the multiple object information determined in the task determining step.

19. The infrared recording method according to claim 17, wherein the information related to the designated special object information includes the information representing the identity of the object or the information representing the identity of the object and the information representing at least one of a unit of the object and a photographing angle.

20. The infrared recording method according to claim 17, wherein the record step is used for generating a thermal image file according to the specified infrared data, the record step comprises a file name generating step for generating a file name of the thermal image file, the file name includes the information related to the designated special object information, the file name includes a classified information arranged in a classified mode or the classified information and time, and the classified information includes the classified information acquired according to the specified information of the designated special object information.

* * * * *